United States Patent [19]

Fowler

[11] Patent Number: 5,422,991
[45] Date of Patent: Jun. 6, 1995

[54] PARALLEL VECTOR GENERATOR AND TRIANGLE GENERATOR INCORPORATING SAME

[75] Inventor: Mark C. Fowler, Kingston, N.Y.

[73] Assignee: International Business Machines Corporation, Armonk, N.Y.

[21] Appl. No.: 949,305

[22] Filed: Sep. 22, 1992

[51] Int. Cl.⁶ .......................................... G06F 15/72
[52] U.S. Cl. .................................................. 395/143
[58] Field of Search ....................... 395/143, 142, 141; 345/135, 136

[56] References Cited

U.S. PATENT DOCUMENTS

| | | | |
|---|---|---|---|
| 4,580,236 | 4/1986 | Tsujioka et al. | 364/719 |
| 4,590,465 | 5/1986 | Fuchs | 340/723 |
| 4,648,049 | 3/1987 | Dines et al. | 364/521 |
| 4,805,116 | 2/1989 | Liang et al. | 364/521 |
| 4,827,445 | 5/1989 | Fuchs | 364/900 |
| 4,873,515 | 10/1989 | Dickson et al. | 340/728 |
| 4,878,182 | 10/1989 | Aranda et al. | 364/518 |
| 4,885,703 | 12/1989 | Deering | 364/522 |
| 4,908,780 | 3/1990 | Priem et al. | 364/521 |
| 4,945,500 | 7/1990 | Deering | 364/522 |
| 4,967,392 | 10/1990 | Werner et al. | 364/900 |
| 5,136,689 | 8/1992 | Waller | 395/143 |
| 5,305,432 | 4/1994 | Kubota | 395/143 |

FOREIGN PATENT DOCUMENTS

| | | |
|---|---|---|
| 0319787 | 11/1988 | Germany . |
| 04244541 | 10/1990 | Germany . |
| 0303361 | 7/1988 | United Kingdom . |

OTHER PUBLICATIONS

Computer Graphics, vol. 24, No. 4, Aug. 1990 "High Speed High Quality Antialiased Vector Generation", A. C. Barkins, pp. 219–326.
IBM Systems Journal, vol. 4, No. 1, 1965 "Algorithm for Computer Control of a Digital Plotter", J. E. Bresenham, pp. 25–30.
IEEE Computer Graphics & Applications, 1990 "Rendering Reconsidered", J. E. Bresenham, Sep. 1990, pp. 42–44.
Computer Graphics, vol. 22, No. 4, Aug. 1988 "The Triangle Processor and Normal Vector Shader: A VLSI System for High Performance Graphics", M. Deering, S. Winner, B. Schediwy, C. Duffy, N. Hunt, ACM, Computer Graphics vol. 22, No. 4, Aug. 1988 pp. 21–30.
Computer Graphics, o. 22, No. 4, Aug. 1988 "High Performance Polygon Rendering," K. Akeley, T. Jermoluk, ACM, CG, vol. 22, No. 4, Aug. 1988, pp. 239–246.
"Raster Algorithm and Software", Foley & Van Dam, 1982, Chapter 11, pp. 431–436.
"Special Architecture for High-Performance Scan Conversion", P. B. Frankeln, A. J. van de Goor, Microprocessor & Microprogramming (1990), pp. 431–438.
Computer Graphics, vol. 15, No. 3, Aug. 1981 "A VLSI Architecture for Updating Raster-Scan Displays", S. Gupta, R. Sproull, ACM Trans. on Graphics, vol. 15, No. 3, Aug. 1981, pp. 71, 78.
"Architectures and Algorithms for Parallel Updates of Raster Scan Displays", S. Gupta (Dec. 1981), Carnegie–Mellon Univ., Doctorial Thesis.

(List continued on next page.)

Primary Examiner—Phu K. Nguyen
Attorney, Agent, or Firm—Mark S. Walker; William A. Kinnaman, Jr.

[57] ABSTRACT

A parallel vector generator in which an Nx × Ny array of processors, each assigned to one particular pixel of each Nx × Ny block of contiguous pixels, operate concurrently to generate a pixel image of a line. Each processor of the array executes a version of the Bresenham line-drawing procedure that is modified so that iterations for pixels over which the processor has no control is eliminated. The processors are capable of processing lines having subpixel endpoints while using only integer arithmetic. Each processor contains a pair of parallel vector generators that are used to generate the endpoints of a triangle along each scan line.

22 Claims, 10 Drawing Sheets

OTHER PUBLICATIONS

"Accurate Rendering sy Subpixel Addressing", O. Lathrop, D. Kirk, D. Voorhees, IEEE, CG&A, Sep. 1990, pp. 45–53.

"Line Drawing Algorithms for Parallel Machines", A. T. Pang, IEEE, CG&A, Sep. 1990, pp. 54–59.

"Parallel Incremental Polygon Rending on a SIMD Processor Array", T. Theoharis, I. Page, 1989, Addison–Wesley Publisher 4d, pp. 329–337.

"Fast Colour Raster Graphics Using an Array Processor", A Walsby, Eurographics 80, Sep. 1980, pp. 303–313.

"Paralleliuzation of Bresenham's Line and Circile Algorithms", W. E. Wright, IEEE, CG&A, Sep. 1990, pp. 60–67.

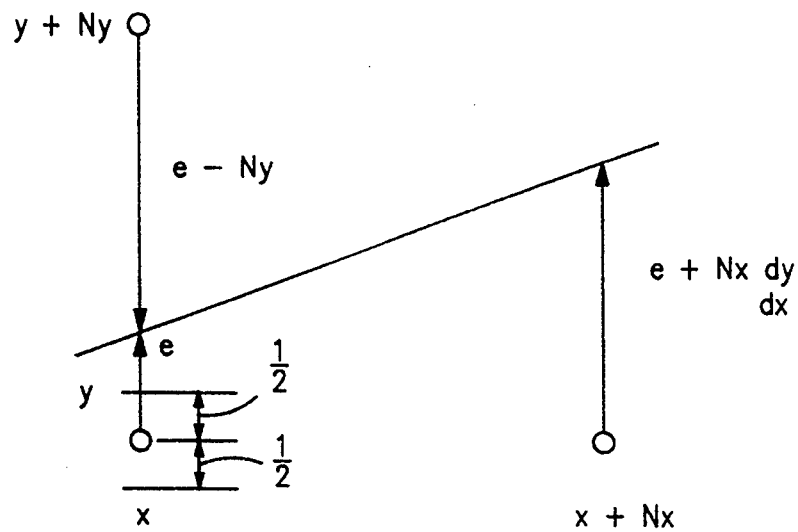
FIG.8a
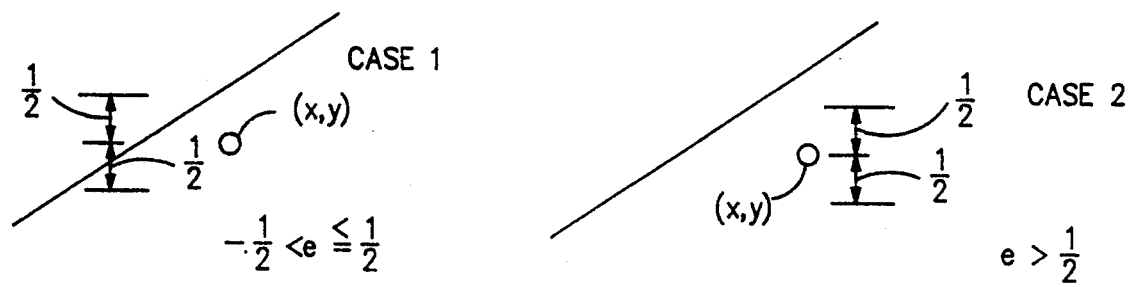
FIG.8b
FIG.8c
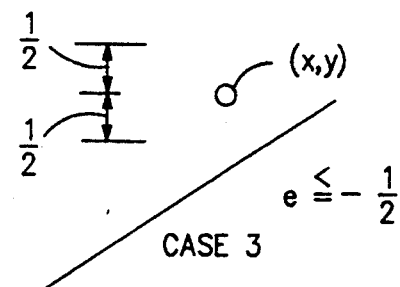
FIG.8d

PARALLEL VECTOR GENERATOR AND TRIANGLE GENERATOR INCORPORATING SAME

BACKGROUND OF THE INVENTION

1. Field of the Invention

This invention relates to a vector generator for drawing lines in a computer graphics system having parallel rasterizers, as well as to a triangle processor containing such a line generator.

2. Description of the Related Art

Line drawing is a basic task in most computer graphics systems, since line segments are the basic elements of the objects (lines, polylines, polygons, etc.) that are displayed on a screen. Generally, "primitives" consisting of or containing line segments are stored in the form of the coordinates of the line endpoints. On the other hand, the actual image that is displayed consists of a two-dimensional (2-D) array of "pixels", each of which in the simplest case may be given either a foreground or a background shading value. In order to display a line segment stored in coordinate form, the line segment must first be "rasterized", or converted to a suitable pattern of pixels approximating the true line.

The most common line-drawing procedures in use today are Bresenham's procedure, described in J. Bresenham, "Algorithm for Computer Control of a Digital Plotter", *IBM Systems Journal* 4(1), 1965, 25-30, and the digital differential analyzer (DDA) procedure described in J. Foley et al., *Computer Graphics: Principles and Practice,* Addison-Wesley, 1990, 73-74. Bresenham's procedure generates lines using integer arithmetic with no divide operations; it also accumulates no error during iteration. The DDA procedure requires a divide operation to calculate the slope of the line and the use of several fraction bits to minimize accumulation error. The divide operation and the additional fraction bits can add significant cost to a hardware implementation of DDA versus Bresenham's procedure.

Despite the clear disadvantage of the DDA procedure, recent line-drawing hardware, described in A. Barkans, "High Speed High Quality Antialiased Vector Generation", Proceedings of SIGGRAPH'90 (Dallas, Tex., Aug. 6-10, 1990), in Computer Graphics 24, 4 (August 1990), pp. 319-326, and K. Akeley et al., "High-Performance Polygon Rendering", Proceedings of SIGGRAPH'88 (Atlanta, Ga., Aug. 1-5, 1988), in Computer Graphics 22, 4 (August 1988), pp. 239-246, has used DDA because it directly supports subpixel addressing. The Apollo DN10000 described in O. Lathrop et al., "Accurate Rendering by Subpixel Addressing", *IEEE Computer Graphics and Application* 10, 5 (September 1990), pp. 45-53, implements a Bresenham-type procedure for line-drawing iteration that supports subpixel precision, but it requires floating-point initialization of the iteration hardware that includes divide and round operations. What is desired is a procedure that provides subpixel precision, yet requires only integer arithmetic.

To support high-performance rendering into a frame buffer most workstations, such as those disclosed by Akeley et al. (1988) and Barkans (1990) in the publications identified above, utilize a parallel processor rendering architecture. Each processor in this array controls a fraction of the screen memory and all processors are interleaved throughout the screen. With the increasing densities available with today's technology it is possible to have each processor accept higher order primitives like lines and triangles rather then single pixels, thus reducing the bandwidth requirements for input to the processor array. However, most current line and triangle iteration procedures work in single-pixel steps requiring a processor to process pixels that it does not own. It is desirable to have a procedure that allows a processor to skip over pixels that it does not own.

W. Wright, "Parallelization of Bresenham's Line and Circle Algorithms", *IEEE Computer Graphics and Application,* 10(5), (September 1990), 60-67, discloses a parallel Bresenham procedure, but it assumes shared memory between processors and that each processor can have control of on arbitrary pixel on the screen. Sharing frame buffer space among raster engines would result in much higher bandwidth requirements going into the frame buffer, therefore in current implementations the pixels for which a processor has control is fixed. Barkans (1990) describes a parallel procedure implemented for four processors, but uses a DDA procedure with its attendant disadvantages.

SUMMARY OF THE INVENTION

This invention provides a means by which a single processor in a parallel system can quickly determine the location of pixels on a line for which it has control, independent of previously written pixels for which it does not have control. This invention utilizes the same type of error term as the standard Bresenham procedure and uses only integer values as well. This invention is a procedure that has all the benefits of Bresenham's procedure (i.e., integer arithmetic, no accumulation error and no divide operations) and is in fact a superset of Bresenham's procedure. In addition to these benefits it also supports subpixel precision.

In general, the present invention contemplates a method and apparatus for generating a pixel approximation of a line in a computer graphics system in which an array of processors are used to convert graphics primitives to a pixel image. Each processor of the array controls a set of pixels spaced from one another by a predetermined first number of pixels along a first coordinate axis and by a predetermined second number of pixels along a second coordinate axis.

Each processor contains initial setup logic for generating an initial pixel position and iteration parameters, together with iteration logic for stepping along the line. The initial pixel position represents a pixel near the first endpoint (but not necessarily on the line) that is controlled by the processor, while the iteration parameters include an initial error term and first and second error increments.

On each iteration cycle, if the error term lies on one side of a predetermined threshold, the iteration logic steps the error term by the first increment and steps the current pixel position along the first axis only. Otherwise, the iteration logic steps the error term by the second increment and steps the current pixel position either along the second axis only or along both the first and second axes, depending on the particular implementation. In contrast to the single-processor version of the procedure described above, steps along the first axis span the predetermined first number of pixels, separating pixels controlled along the first axis by the same processor, while steps along the second axis span the predetermined second number of pixels separating pixels along the second axis controlled by the same processor. The iterations performed by each processor thus skip pixels that the processor does not control, reducing the number of iteration cycles considerably.

The various processors of the array cooperate to generate one line pixel, which is drawn, for each pixel position along a selected coordinate axis (which will be assumed to be the first axis). This axis will usually be the major axis of the line, but may be the minor axis when generating the points along the edge of a triangle. Since several processors of the array may be concurrently generating pixel positions having the same first-axis coordinate, the pixel positions generated by the iteration logic of a particular processor are not necessarily the closest pixels to the true line at a given first-axis position. The iteration logic associated with each processor therefore tests each pixel position successively generated the processor to determine whether the pixel position bears a predetermined relationship to the true line at the first-axis position. For a typical line-drawing application, this predetermined relationship will be that the pixel position lies within half a pixel of the true line along the second axis. If the pixel position passes the test, then the corresponding pixel is considered to be on the line and is drawn. Otherwise, the error term and pixel position are stepped, but no pixel is drawn, by the particular processor for the particular iteration. This again contrasts with the single-processor version of the Bresenham procedure, in which a pixel is drawn on every cycle.

Each processor may include a pair of vector generators operating as described above to generate endpoints along successive scan lines of a triangle that are controlled by the processor. The first vector generator is operated to generate a first endpoint bearing a predetermined relationship to a first edge of the triangle intersecting the scan line, while the second vector generator is operated to generate a second endpoint bearing a predetermined relationship to a second edge of the triangle intersecting the same scan line. The predetermined relationship may be that the endpoint pixel generated is the closest pixel to the triangle edge on the interior side of the scan line that is controlled by the processor. Scan logic associated with each processor draws the pixels controlled by the processor on each scan line between the first and second endpoints, so that the overall result is that all of the interior pixels of the triangle are drawn.

The procedure works equally well for line endpoints expressed with subpixel precision. This invention provides a means to use subpixel precision when rendering lines without expensive floating-point divides and without any accumulation error. This invention describes an procedure that is more like Bresenham's in nature and thus has the same benefits.

BRIEF DESCRIPTION OF THE DRAWINGS

FIGS. 8a–8d show the actual approximation error as it varies in different situations.

DESCRIPTION OF THE PREFERRED EMBODIMENTS

1. Overview

Figure 1:
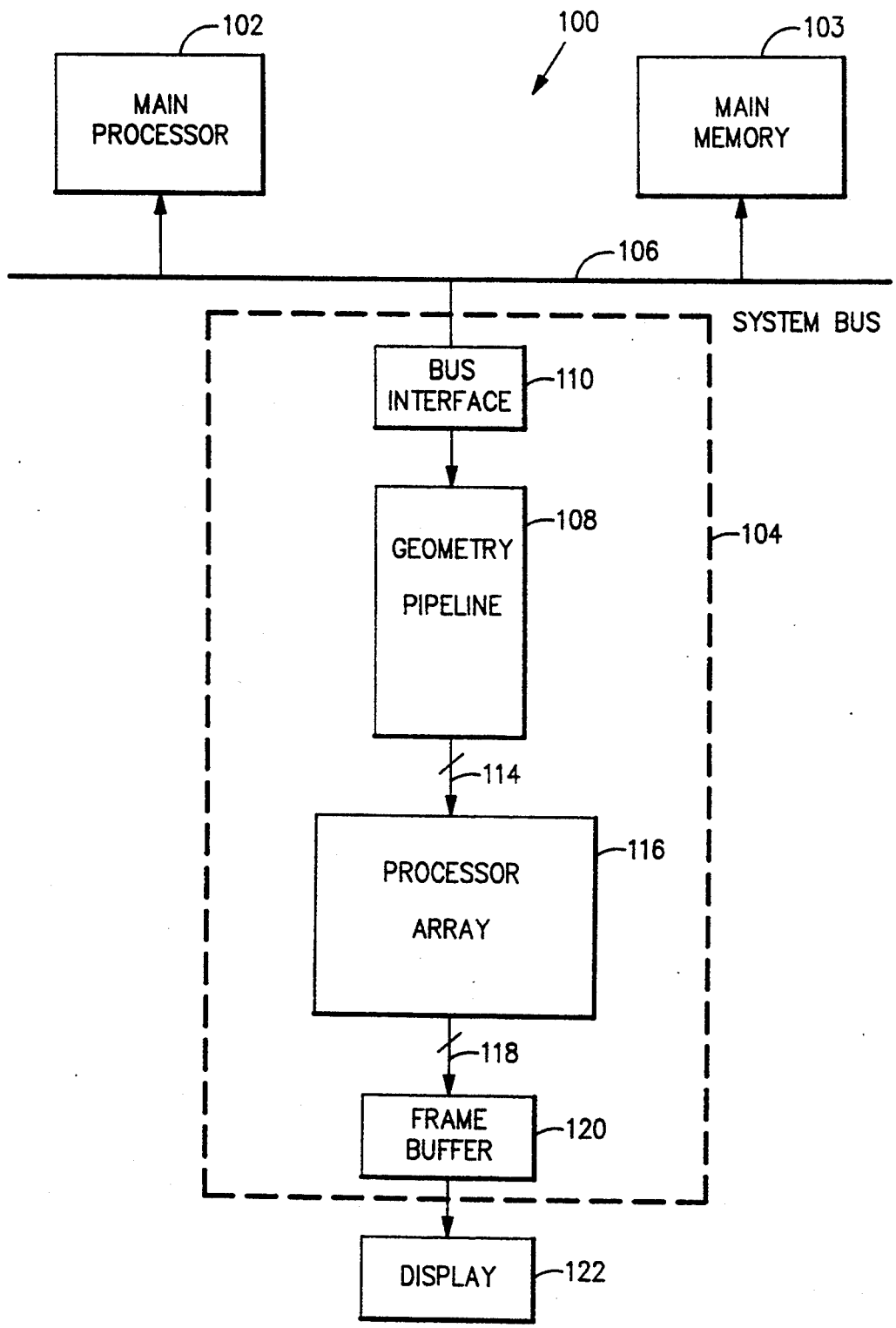
FIG. 1 is a schematic block diagram of a computer graphics system incorporating one embodiment of the present invention.

Referring to FIG. 1, a system 100 incorporating the present invention includes a host processor 102 and a graphics adapter or subsystem 104 coupled to host processor 102 and to a main memory 103 via a system bus 106. Host processor 102 controls the overall operation of system 100, including aspects not directly related to the operation of the graphics subsystem 104. Main memory 103 stores instructions and data handled by processor 102, including graphics primitive data that is sent to graphics subsystem 104. In addition to the elements shown, system 100 includes conventional input/output (I/O) devices such as a keyboard, a mouse or other pointing device, and secondary storage such as a magnetic or optical disk (not shown). Host processor 102 may be a RISC-based processor such as that of an IBM RISC System/6000 workstation, while bus 106 may be a bus such as the Micro Channel bus having a 32-bit data path. (RISC System/6000 and Micro Channel are trademarks of IBM Corporation.)

Graphics subsystem 104 includes a geometry pipeline 108 coupled to bus 106 via a bus interface 110. Geometry pipeline 108 performs conventional operations on graphics primitives representing lines, polygons and the like, including coordinate transformation, clipping, and mapping to the coordinate system of the output device. Geometry pipeline 108 is in turn coupled via a bus 114 to a processor array 116 that is the subject of the present invention.

Processor array 116 is coupled via a pixel bus 118 to a frame buffer 120, which stores color information for each picture element (pixel or pel) of the display. A typical display in a graphics workstation, such as in the RISC System/6000 referred to above, may span 1280 pixels horizontally and 1024 pixels vertically. Frame buffer 120 contains a predetermined number of bit planes for color information (8 and 24 planes are common numbers) and, optionally, additional planes for storing window information, overlay information, and the like. Color information is periodically scanned out of the frame buffer 120 along horizontal scan lines and supplied to the color (RGB) inputs of a display monitor 122. Although in the system shown in FIG. 1 the display device is a monitor, the present invention may also be used with other display devices such as printers.

Processor array 116 accepts data from the geometry pipeline 108, which may represent a straight line segment or vector in terms of the coordinates of its endpoints, and rasterizes that data by converting it to a form suitable for storage in the frame buffer 120 and display on monitor 122. In particular, processor array 116 generates a pixel approximation of an ideal line segment by generating appropriate intensity values for pixels adjacent to the ideal line, while simultaneously generating address values corresponding to pixel locations on the display screen. These intensity and address values are placed on the data and address lines (not separately shown) of the pixel bus 118 coupling processor array 116 and frame buffer 120.

Figure 2:
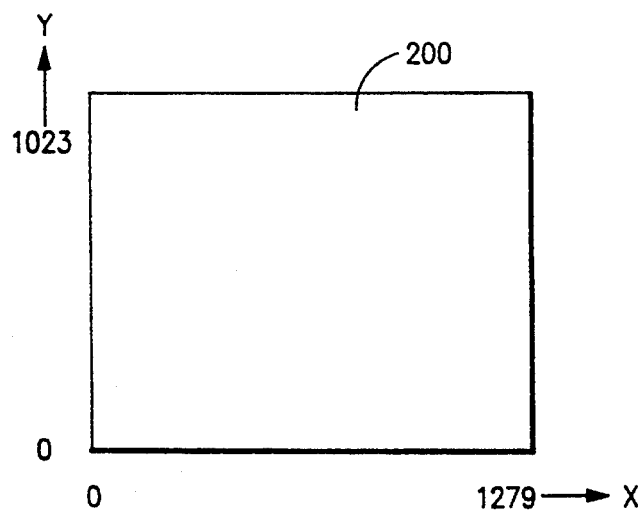
FIG. 2 is a view of the image area of the display of the system shown in FIG. 1.

Referring to FIG. 2, the image 200 that is displayed on the display surface of monitor 122 is made up of a two-dimensional (2-D) array of pixels, in this particular example 1024 rows of pixels with 1280 pixels in each row. The pixels are identified with reference to an x-y coordinate system having its origin at the lower left corner of the image 200, with adjacent pixels having a unit spacing from one another, so that the lower left pixel has (x, y) coordinates (0, 0) and the upper right pixel has (x, y) coordinates (1279, 1023).

Figure 4:
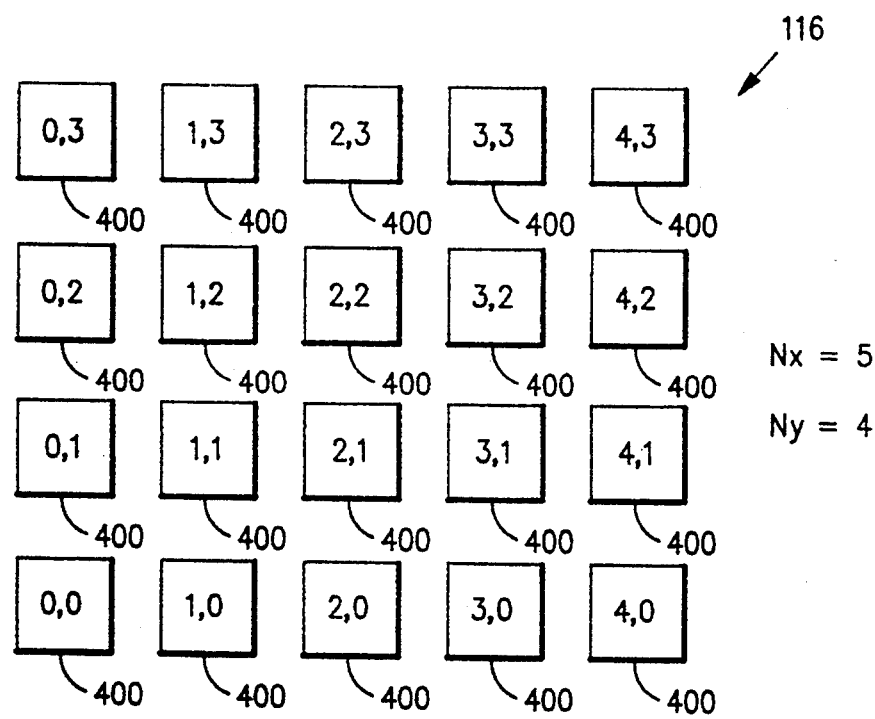
FIG. 4 is a schematic block diagram of the processor array of the rasterizer portion of the system shown in FIG. 1.

Referring to FIG. 4, processor array 116 comprises a 2-D array of processors 400 consisting of Nx columns and Ny rows. In the particular example shown, Nx=5 and Ny=4, but other values could be used. Individual processors 400 of the array 116 are identified by the array coordinates (xid, yid), where xid identifies the column of the array and yid identifies the row. As with the pixels making up image 200 (FIG. 2), the processor 400 at the lower left-hand corner of the array is considered to be located at the origin of the array 116, with array coordinates (0, 0). Although not shown in FIG. 4, each processor 400 of the array is coupled to geometry pipeline 108 (FIG. 1) via bus 114 and to frame buffer 120 via pixel bus 118.

Figure 3:
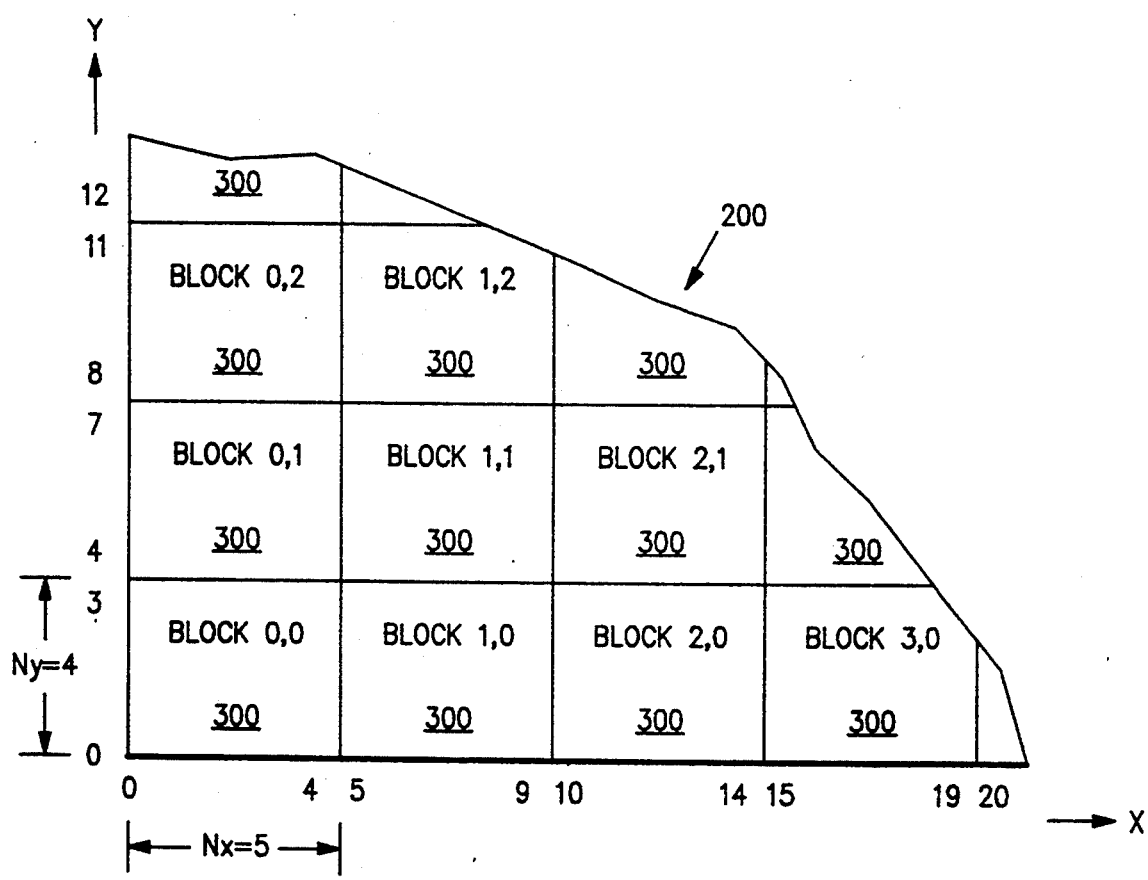
FIG. 3 shows the partitioning of the image area of FIG. 2 into blocks of pixels.
Figure 5:
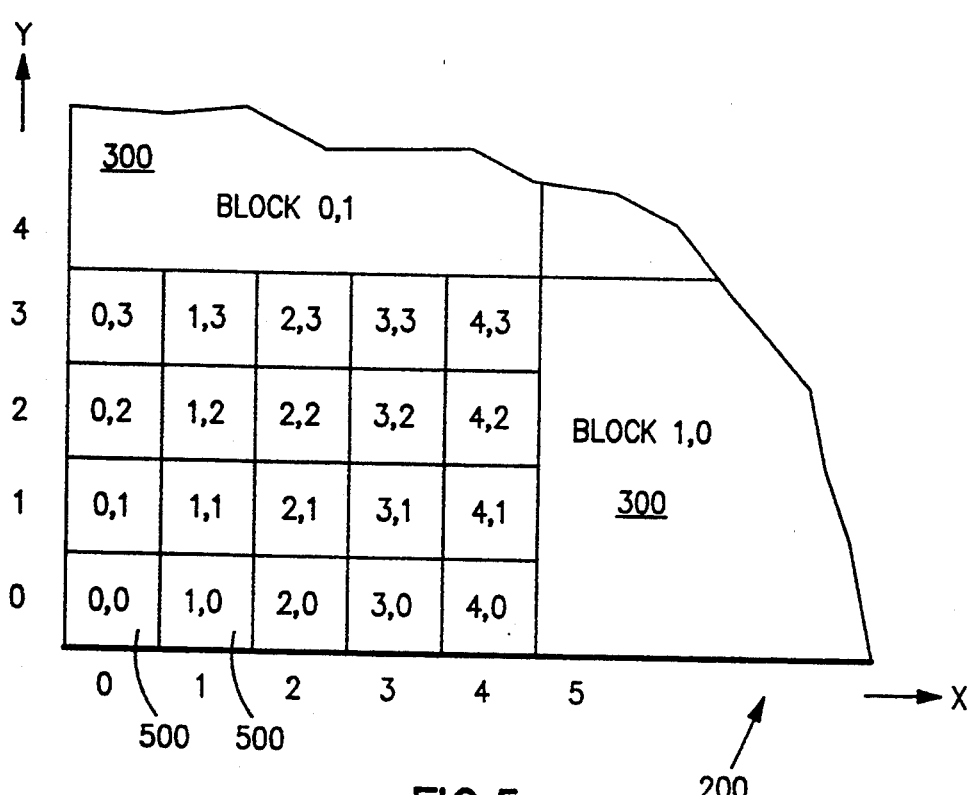
FIG. 5 shows the assignment of various pixels within a block to processors of the array shown in FIG. 4.

Referring to FIGS. 3 and 5, processors 400 are fixedly assigned to the pixels of the image 200 in such a manner that each processor controls one and only one pixel from each Nx × Ny block into which the image is divided. For this purpose, image 200 may be considered to be divided into blocks 300, each of which is Nx pixels wide and Ny pixels high. In the example given above, in which the image is 1280 pixels wide by 1024 pixels high, Nx=5 and Ny=4, there are 256 rows of blocks 300 with 256 blocks in each row. Individual blocks 300 are identified using an (xb, yb) block coordinate scheme similar to the (xid, yid) scheme for identifying processors 400 (FIG. 4), with the block at the lower left-hand corner of the image having block coordinates (0,0).

Referring to FIG. 5, each pixel 500 within a block 300 is assigned pixel coordinates (xp, yp) with the origin at the lower left-hand corner, so that the lower left-hand pixel of each block has pixel coordinates (0, 0). In accordance with the present invention, each pixel 500 of a given block 300 is handled by the processor 400 having array coordinates (xid, yid) corresponding to the pixel coordinates (xp, yp), so that pixel (0, 0) is handled by processor (0,0), pixel (0,1) is handled by processor (0, 1), and so on. In general, for a given pixel 500 at screen coordinates (x, y), $$(xid, yid) = (x \bmod N_x, y \bmod N_y)$$

are the array coordinates of the processor 400 that controls the pixel at (x, y). No two pixels 500 within any one block 300 are thus controlled by the same processor 400.

Pixels 500 are thus interleaved among the processors 400 both vertically and horizontally, with an interleaving factor of Nx horizontally and Ny vertically. As discussed below, this interleaving requires a modified line-drawing procedure so that processors 400, which operate in parallel to process the pixels that they individually control, do not perform needless iterations for pixels that they do not control.

2. Error Term Derivation

Figure 6:
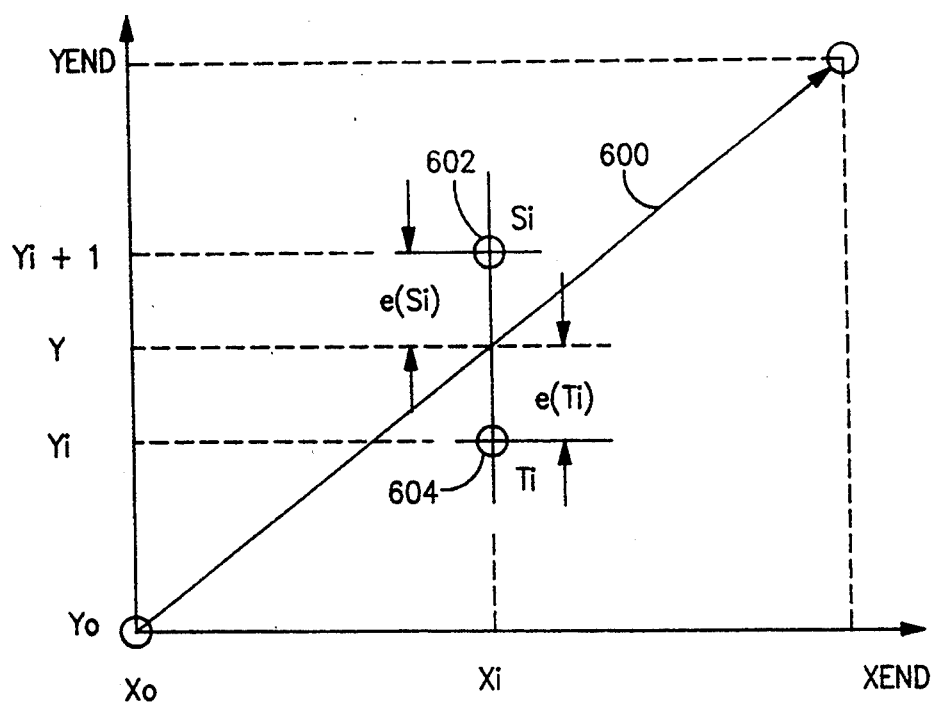
FIG. 6 is a diagram showing the derivation of the error term used in the present invention.

The line-drawing procedure will first be discussed generally, without regard to the particular modifications made for parallel operation. FIG. 6 shows a line 600 with initial point (x0, y0) and two integer points in space, $T_i = (x_i, Y_i)$ and $S_i = (x_i, Y_i+1)$, corresponding respectively to a lower pixel 604 and an upper pixel 602. We wish to know whether the line at $x_i$ is closer to Ti or Si. If y represents the ideal value at $x_i$ then $$y = (dy/dx)(x_i - x0) + y0,$$
where
$$dy = yend - y0$$
$$dx = xend - x0$$
$$0 \leq dy \leq dx.$$

The following are errors for Ti and Si which represent their respective distances from the line at $x_i$:

$$e(Ti) = y - Y_i \quad e(Si) = Y_i + 1 - y.$$

If $e(Ti) < e(Si)$ then Ti is closer to the ideal line then Si. We can use the difference $$e(Ti) - e(Si) = 2(dy/dx)(x_i - x0) - 2(y_i - y0) - 1$$

to determine which point is closer. If $e(Ti) - e(Si) < 0$ then Ti is closer.

Let $d_i = dx(e(Ti) - e(Si))$ to convert to all integers; the sign of the error is preserved:

$$(1) \quad d_i = 2dy(x_i - x0) - 2dx(y_i - y0) - dx.$$

If $d_i < 0$ then $(x_i, Y_i)$ is closer to the line than $(x_i, Y_i+1)$. For iteration replace i by i+1 to obtain:

$$d_{i+1} = 2dy(x_{i+1} - x0) - 2dx(y_{i+1} - y0) - dx.$$

Write $d_{i+1}$ in terms of $d_i$ to get the amount by which the error term must be updated at each step:

$$(2) \quad d_{i+1} = d_i + 2dy(x_{i+1} - x_i) - 2dx(y_{i+1} - y_i).$$

For initialization, start the process by letting i=0 in equation (1) to obtain $$(3) \quad d0 = -dx$$

Figure 7:
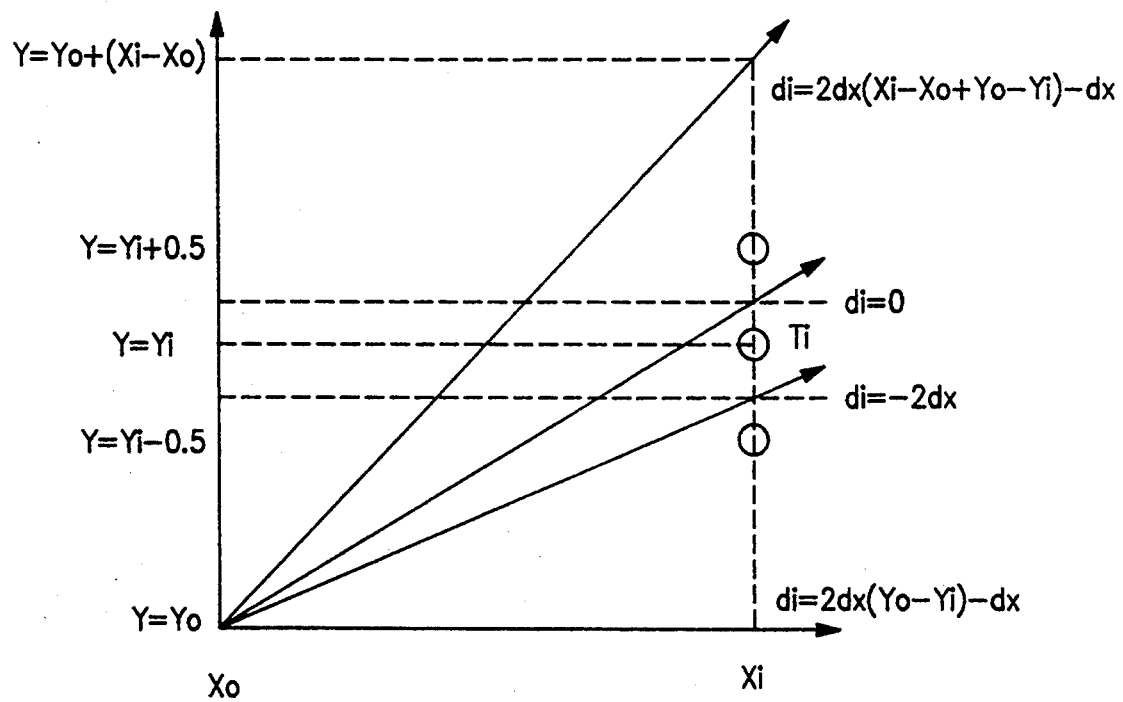
FIG. 7 is a diagram showing the range of the error term.

FIG. 7 shows how the error term $d_i$ varies with the vertical distance of the true line from Ti at $x_i$. From FIG. 7 it is evident that for Ti to be the closest pixel to the line at $x_i$, the following criterion must be met:

(4) $-2dx < d_i > 0$

Now that an error term has been derived, we must determine how to use it to generate pixels on a line or edge. To generate pixels on a line, we must determine $(x_{i+1}, Y_{i+1})$ from $d_i$. Bresenham's procedure is a specific case where $x_{i+1} - x_i$ and $Y_{i+1} - Y_i$ are either 1 or 0. In order to develop an procedure for subpixel addressing and parallel processing, the general version of equation (2) will be preserved.

3. Parallel Line Drawing

Figure 10:
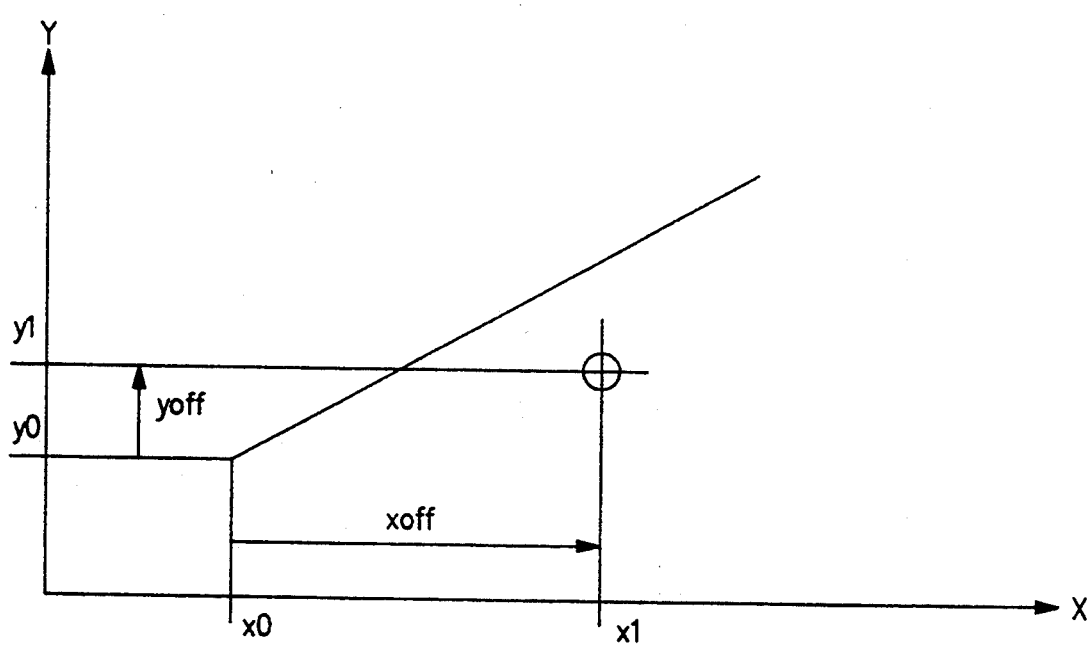
FIG. 10 is a diagram showing the derivation of the offsets for the initial pixel position.

To facilitate parallel rendering it is desirable for each processor 400 to jump between blocks 300 rather then iterating through intermediate pixels 500 that it does not control. To render a line each processor 400 uses equations (2–4) to properly iterate along the line. To initialize itself each processor must find its initial offset (xoff, yoff) from the initial vertex (x0, y0) of the line, where $$xoff = x1 = x0 \quad yoff = y1 - y0$$

and (x1, y1) are the coordinates of a first pixel controlled by the individual processor 400. FIG. 10 shows the geometry underlying this calculation.

From equation (2), the error d1 at (x1, y1) is given by the formula $$d1 = -dx + 2dy(xoff) - 2dx(yoff).$$

Figure 9:
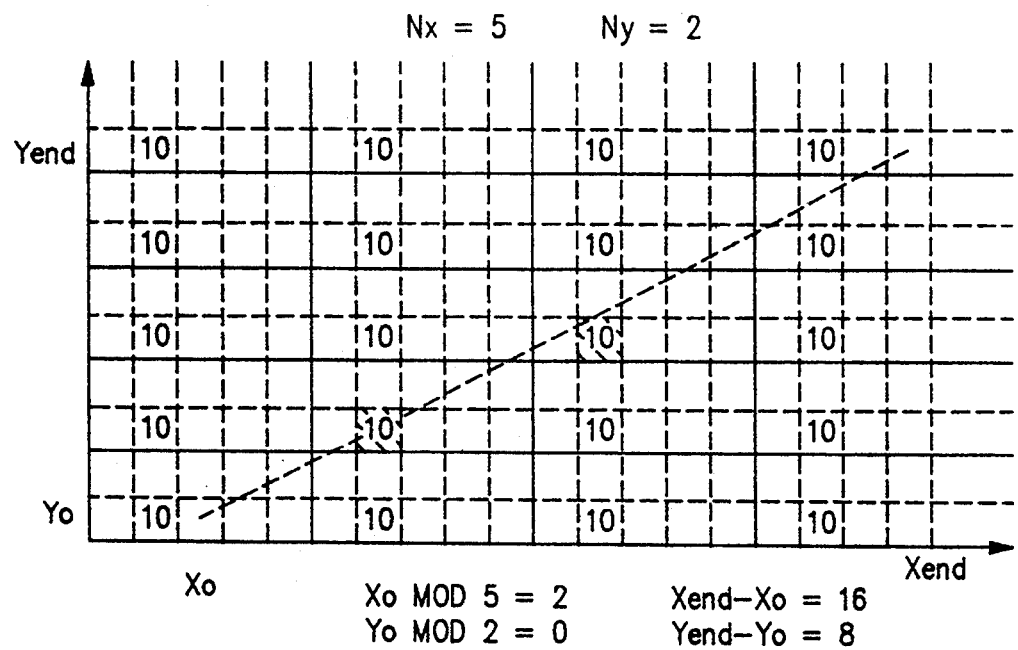
FIG. 9 is a diagram showing an embodiment of the invention using a 5×2 processor array.

FIG. 9 shows a 5×2 rendering system with the processor 400 at (xid, yid)=(1,0) drawing pixels that it owns for a line starting at (x0,y0). The processor 400 must increment in y ($Y_{i+1} = Y_i + 2$) until it is on or above the line ($d_i > 0$) to ensure it does not miss any pixels. For each iteration the processor 400 tests the error term with equation (4) to see if it is on the line. Once the processor 400 is on or above the line ($d_i > 0$), the processor may increment in x ($x_{i+1} = x_i + 5$) to repeat the process. The procedure used for this example is shown as Procedure 1 below.

---
PROCEDURE 1
---

```
Procedure DrawLine(x0, y0, xend, yend: integer); {0 ≤ dy ≤ dx}
var
   dx, dy: integer;          {delta x and delta y of the line}
   xoff, yoff: integer;      {x1 − x0, y1 − y0}
   x, y: integer;            {xi, yi)
   d, incrx, incry: integer; {di, 2dy(xi+1 − xi), 2dx(yi+1 − yi)}
begin
   dx := xend − x0;
   xoff := xid − (x0 MOD Nx);
   If xoff < 0 then xoff := xoff + Nx; {Skip to the next block}
   x := x0 + xoff; {x1}
   dy := yend − y0;
   yoff := yid − (y0 MOD Ny);
   If yoff < 0 then yoff := yoff + Ny; {skip to the next block}
   y := y0 + yoff; {y1}
   incrx := 2*Nx*dy; {2dy(xi+1 − xi)}
   incry := −2*Ny*dx; {-2dx(yi+1 − yi)}
   d := −dx + 2*dy*xoff − 2*dx*yoff; {Eq. (2)}
   While x ≤ xend do
      begin {Loop}
         If −2*dx < d ≤ 0 then Putpixel(x, y); {On the Line}
         If d ≤ 0 then
            begin {On or above the line}
               d = d + incrx;
               x := x + Nx {Increment x axis}
            end {On or above the line}
         Else
            begin {Below the line}
               d := d + incry;
```

---
PROCEDURE 1
---

```
               y := y + Ny {Increment y axis}
            end {Below the line}
      end {Loop}
end;
```

On examining Procedure 1 we see that a single processor in a multiprocessor system, executing this procedure, may not write a pixel for every iteration. However, with any multiprocessor system up to Nx pixels on a line may be written in a single cycle. With the generalization of this procedure to be discussed below, it may shown that for lines where dy>dx up to Ny pixels on a line may be written in a single cycle.

Steps 120 and 121 imply that if the true line intersects the current x-axis position halfway between two vertically adjacent pixels, it is assigned to the lower pixel. However, this is an arbitrary assignment and such intersections could alternatively be assigned to the upper pixel.

In Procedure 1, the error term d as defined at step 117 is used to permit comparisons with zero (steps 120–121). However, in certain hardware configurations it might be preferable to use an error term d′, where:

$$d' = d + dx.$$

If the error term d′ is used, it would be initially defined (step 117) by the equation:

$$d' = 2dy*xoff - 2dx*yoff.$$

Further, step 120 would determine whether:

$$-dx < d \leq dx,$$

while step 121 would determine whether:

$$d' < -dx.$$

Since d and d′ merely differ by a constant, the error increments incrx and incry for d may also be used for d′.

The error terms d and d′ defined above are used to facilitate the use of integer arithmetic, which is an important consideration for a hardware realization. However, Procedure 1 might be understood more clearly if it is followed in terms of the actual error:

$$e = (d + dx)/2dx$$
$$= d/2dx + 1/2,$$

where e represents the minor axis distance between the true line and the current pixel (FIG. 8a). Note that in contradistinction to the example given earlier, e is defined here as an algebraic difference so that e is positive if the true line is above the current pixel and is negative if the true line is below the current pixel. With this transformation, the initial parameters (steps 115–117) become:

$$incrxe = Nx*dy/dx$$
$$incrye = -Ny$$
$$e = dy/dx*xoff - yoff,$$

where incrxe and incrye are the increments in the error term e along the x and y axes, respectively.

Recast in terms of the error term e, step 120 effectively determines whether:

$$-\tfrac{1}{2} < e < -\tfrac{1}{2},$$

while step 121 effectively determines whether $$e \leq \tfrac{1}{2}.$$

Three different cases can be distinguished, based upon the value of the error term e (or d or d') at steps 120 and 121:

Case 1: $-1/2 < e \leq 1/2$
 $(-2dx < d \leq 0;$
 $-dx < d' \leq dx)$

Case 2: $e > 1/2$
 $(d > 0;$
 $d' > dx)$

Case 3: $e \leq -1/2$
 $(d \leq -2dx;$
 $d' \leq -dx).$

In Case 1 (FIG. 8b), the true line passes though the pixel controlled by the individual processor 400 at the current x position. This pixel is therefore written (step 120). Since the true line may also pass through the next pixel (x+Nx, y) along the x-axis controlled by the same processor 400, the processor then advances along the x-axis to that pixel, and the error term adjusted accordingly:

e = e + Nx*dy/dx
 (d = d + 2Nx*dy;
 d' = d' + 2Nx*dy).

In Case 2 (e>½), the true line passes above the pixel controlled by the individual processor 400 at the current x position (FIG. 8c). This pixel is therefore not written, since it is controlled by another processor. Since the true line will be at least the same distance above the next pixel (x+Nx, y) along the x-axis controlled by the same processor 400, the processor then advances along the yaxis to the next pixel (x, y+Ny) controlled by the processor, and the error term adjusted accordingly:

e = e − Ny
 (d = d − 2Ny*dx;
 d' = d' − 2Ny*dx).

In Case 3 (e≤−½), the true line passes below the pixel controlled by the individual processor 400 at the current x position (FIG. 8d). This pixel is therefore also not written, since it is controlled by another processor 400. However, since the true line may pass through the next pixel (x+Nx, y) along the x-axis controlled by the same processor 400, the processor then advances along the x-axis to that pixel, and the error term adjusted accordingly, as in Case 1:

e = e + Nx*dy/dx
 (d = d + 2Nx*dy;
 d' = d' + 2Nx*dy).

It will be noted that, whereas the usual Bresenham procedure for a single processor steps either diagonally or along the major axis, Procedure 1 steps either along one axis or the other, depending on the error term. This is necessary where Nx ≠ Ny to be able to draw certain lines having a slope approximating unity. Thus, if Nx=5 and Ny =4, then a line in the first octant (dx>dy>0) with a slope m=dy/dx>Ny/Nx=0.8 cannot be followed with only major axis or diagonal steps. A modification of Procedure 1 using diagonal jumps for the special case of Ny=Nx is described below.

Procedure 1 is used to generate pixels that are closest to a line, which is the desired objective when drawing a line. However, by slight modification, the procedure may be used to generate pixels lying on a given side of a line, as may be desired when generating endpoints along a given scan line of a triangle as described below.

4. Subpixel Precision

The reason for using subpixel precision is to increase the accuracy with which a line or polygon is placed in the display. With subpixel precision the endpoints of a line are expressed with fixed bit coordinates with a constant number of fraction bits. However, the display being written is addressed with integer coordinates, so we can still iterate with integer values. The function of a line-drawing procedure, then, is to render the closest pixels in integer coordinates to a line represented with subpixel endpoints. FIG. 10, if assumed to show a single pixel in screen space with a subpixel endpoint, is essentially a subset of FIG. 6; therefore for generating a line we can use equations (2–4) again.

With subpixel addressing we have several options on how the endpoints are drawn. For this procedure the endpoints drawn will be the last pixels where the line crosses the midpoint of the pixel with respect to the major axis. For endpoints lying directly on the midpoint of a pixel, the rightmost endpoint will not be drawn and the leftmost pixel is drawn. This methodology ensures that no two pixels are drawn twice for a given polyline.

The only modification to Procedure 1 necessary to draw lines represented with subpixel endpoints is that the error term and offsets must now be represented with fixed bit data:

---
PROCEDURE 2

```
Procedure DrawLine(x0, y0, xend, yend: fixed); {0 ≤ dy ≤ dx}
var
    dx, dy: fixed; {delta x and delta y of the line}
    xoff, yoff: fixed; {x1 − x0, y1 − y0}
    x, y: integer; {xi, yi}
    d, incrx, incry: fixed; {di, 2dy(xi+1 −xi), 2dx(yi+1 − yi)}
begin
    dx := xend − x0;
    xoff := xid − (x0 MOD Nx);
    If xoff < 0 then xoff := xoff + Nx; {Skip to the next block}
    x := truncate(x0 + xoff); {x1}
    dy := yend − y0;
    yoff := yid − (y0 MOD Ny);
    If yoff < −0.5 then yoff := yoff + Ny; {Skip to the next block}
    y := truncate(y0 + yoff); {y1}
    incrx := 2*Nx*dy; {2dy(xi+1 − xi)}
    incry := −2*Ny*dx; {−2dx(yi+1 − yi)}
    d := −dx + 2*dy*xoff − 2*dx*yoff; {Eq. (2)}
    While x ≤ xend do
        begin {Loop}
            If −2*dx < d ≤ 0 then Putpixel(x, y); {On the line}
```

-continued
PROCEDURE 2

```
    If d ≦ 0 then
        begin {On or above the line}
            d := d + incrx;
            x := x + Nx {Increment x axis}
        end {On or above the line}
    Else
        begin {Below the line}
            d := d + incry;
            y := y + Ny {Increment y axis}
        end {Below the line}
    end {Loop}
end;
```

5. Optimization for Square Arrays

When Nx=Ny the multistep procedure can be optimized to enable diagonal jumping as opposed to being limited to vertical or horizontal jumps. This can be done since, like Bresenham's procedure, there are only two candidate pixels for a processor to chose from for the closest pixel to the line. To implement diagonal jumping the error term is updated to reflect a jump in the major axis for every iteration, then it is checked to determine whether or not to increment y by N. Since the error term is automatically updated to reflect the next jump in the major axis, equation (4) is altered to adjust the error term to reflect the current x value ($x_i$) rather then the next x value.

This optimization for square arrays is incorporated into Procedure 3, set forth below:

PROCEDURE 3

```
Procedure DrawLine(x0, y0, xend, yend: fixed); {Nx = Ny = N}
var
    dx, dy: fixed; {delta x and delta y of the line}
    xoff, yoff: fixed; {x1 − x0, y1 − y0}
    x, y: integer; {xi, yi}
    d, incrx, incrxy: fixed; {Error term variables}
begin
    dx := xend − x0;
    xoff := xid − (x0 MOD N);
    If xoff < 0 then xoff := xoff + N; {Skip to the next block}
    x := truncate(x0 + xoff); {x1}
    dy := yend − y0;
    yoff := yid − (y0 MOD N);
    If yoff < −0.5 then yoff := yoff + N; {Skip to the next block}
    y := truncate(y0 + yoff); {y1}
    incrx := 2*N*dy;
    incrxy := 2*N*dy − 2*N*dx;
    d := −dx + 2*dy*xoff − 2*dx*yoff + incrx; {Eq. (2) + next
        jump
        in major axis}
    While x ≦ xend do
        begin {Loop}
            If incrx − 2dx < d ≦ incrx then Putpixel(x, y); {On the
                Line}
            If d ≦ 0 then
                begin {On or above the line}
                    d := d + incrx;
                    x := x + N {Increment x axis}
                end {On or above the line}
            Else
                begin {Below the line}
                    d := d + incrxy;
                    y := + N; {Increment y axis}
                    x := x + N; {Increment x axis}
                end {Below the line}
        end {Loop}
end;
```

Procedure 3 begins to look like the familiar Bresenham's procedure and is in fact a superset of Bresenham's procedure. Since Procedure 3 is a subset of Procedure 2 then Bresenham's procedure is also a subset of Procedure 2. Bresenham's procedure operates on the following assumptions:

Nx=Ny=N=1 (i.e., a pixel is drawn every iteration)

xoff=yoff=0 (i.e., no subpixel offset).

With these assumptions Procedure 3 becomes Bresenham's procedure, set forth below:

BRESENHAM'S PROCEDURE

```
Procedure DrawLine(x0, y0, xend, yend: integer);
var
    dx, dy: integer; {delta x and delta y of the line}
    x, y: integer; {xi, yi}
    d, incrx, incrxy: integer; {Error term variables}
begin
    dx := xend − x0;
    x := x0; {x1}
    dy := yend − y0;
    y := y0; {y1}
    incrx := 2*dy;
    incrxy := 2*dy − 2*dx;
    d := −dx + incrx; {initial error plus next step in major axis}
    While x ≦ xend do
        begin {Loop}
            Putpixel(x, y);
            If ≦ 0 then
                begin {On the line}
                    d := d + incrx;
                    x := x + 1 {Increment x axis}
                end {On the line}
            Else
                begin {below the line}
                    d := d + incrxy;
                    y := y + 1: {Increment y axis}
                    x := x + 1 {Increment x axis}
                end {Below the line}
        end {Loop}
end;
```

6. Addressing

When a processor writes a pixel into the display it needs to convert the screen address into a row-column address for the frame buffer. In a multiprocessor system each processor controls a section of the frame buffer so it is convenient that each Nx ×Ny block on the screen have the same row-column address, while the coordinates of pixels, internal to the block, point to a particular processor-module complex. With this scheme we represent screen coordinates with four components (xb, xp, yb, yp) where (xb, yb) is a block coordinate and (xp, yp) is the coordinate internal to the block. Thus, if (x, y) are the normal screen coordinates, we have:

xb = x DIV Nx
xp = x MOD Nx
yb = y DIV Ny
yp = y MOD Ny.

For any given pixel and any given processor, if (xp, yp)=(xid, yid) then that processor owns the pixel. With input coordinates represented in this manner Procedure 2 changes as shown in Procedure 4.

Another change that we want to add is to make exiting the loop contingent on both the major and minor axis. This is so a processor can avoid iterations on a line it never intersects, for example when dy<Ny.

| PROCEDURE 4 |
|---|
| Procedure DrawLine(xb0, yb0, xbend, ybend: integer; xp0, yp0, xpend, ypend: fixed);<br>var<br>    dx, dy: fixed; {delta x and delta y of the line}<br>    xoff, yoff: fixed; {x1 − x0, y1 − y0}<br>    xb, yb: integer; {current block coordinates}<br>    xlen, ylen: integer; {delta x and delta y of the line in blocks}<br>    d, incrx, incry: fixed; {Error generation variables}<br>begin<br>    dx:= Nx*(xbend − xb0) + (xpend − xp0);<br>    xoff := xid − xp0;<br>    If xoff < 0 then<br>      begin {Skip to the next block}<br>        xoff := xoff + Nx;<br>        xb := xb0 + 1<br>      end {Skip to the next block}<br>    Else xb := xb0;<br>    If xpend ≦ xid then xlen := xbend − xb − 1 {Find x length}<br>    Else xlen := xbend − xb;<br>    dy := Ny*(ybend −yb0) + (ypend −yp0);<br>    yoff := yid −yp0;<br>    If yoff < −0.5 then<br>      begin {Skip to the next block}<br>        yoff := yoff + Ny;<br>        yb := yb0 + 1<br>      end {Skip to the next block}<br>    Else yb := yb0;<br>    If ypend + 0.5 ≦ yid then ylen := ybend − yb − 1 {Find y length}<br>    Else ylen := ybend − yb; |

-continued

| PROCEDURE 4 |
|---|
|     d := −dx + 2*dy*xoff − 2*dx*yoff; {initial error}<br>    incrx := 2*Nx*dy;<br>    incry := −2*Ny*dx;<br>    While xlen ≧ 0 AND ylen ≧ 0 do<br>      begin {Loop}<br>        If −2*dx < d ≦ 0 then Putpixel(xb, yb); {On the Line}<br>        If d ≦ 0 then<br>          begin {On or above the line}<br>            d := d + incrx;<br>            xb := xb + 1; {Increment x axis}<br>            xlen := xlen − 1<br>          end {On or above the line}<br>        Else<br>          begin {below the line}<br>            d := d + incry;<br>            yb := yb + 1; {Increment y axis}<br>            ylen := ylen − 1<br>          end {Below the line}<br>      end {Loop}<br>end; |

7. General Procedure

The discussion so far has been specific to a line where $0 \leq dy \leq dx$. Like Bresenham's procedure, Procedure 4 can be easily generalized for all lines. The following procedure is also symmetrical in that identical pixels will be written for a line no matter what endpoint the procedure starts with.

| GENERAL PROCEDURE |
|---|
| Procedure DrawLine(majb0, minb0, majbend, minbend: integer; majp0, minp0, majpend, minpend: fixed; xgey: boolean);<br>var<br>    dmaj, dmin: fixed; {delta major and delta minor of the line}<br>    Smaj, Smin: boolean; {Signs of dmaj and dmin}<br>    maj_off, min_off: fixed; {maj1 − maj0, min1 − min0}<br>    majb, minb: integer; {current block coordinates}<br>    majlen, minlen: integer; {delta major and delta minor of the line in blocks}<br>    d, incr_maj, incr_min: fixed; {Error generation variables}<br>begin<br>    dmaj := Nmaj*(majbend −majb0) + (majpend −majp0);<br>    If dmaj < 0 then<br>      begin {Negative dmaj}<br>        dmaj := −dmaj;<br>        Smaj := 1;<br>        maj_off := majp0 −majid;<br>        If maj_off ≦ 0 then<br>          begin {Skip to the next block}<br>            maj_off := maj_off + Nmaj;<br>            majb := majb0 − 1<br>          end {Skip to the next block}<br>        Else majb := majb0;<br>        If majpend ≦ majid then majlen := maj −majbend − 1 {Find major length}<br>        Else majlen := majb −majbend<br>      end {Negative dmaj}<br>    Else<br>      begin {Positive dmaj}<br>        Smaj := 0;<br>        maj_off := majid −majp0;<br>        If maj_off < 0 then<br>          begin {Skip to the next block}<br>            maj_off := maj_off + Nmaj;<br>            majb := majb0 + 1<br>          end {Skip to the next block}<br>        Else majb := majb0;<br>        If majpend ≦ majid then majlen := majbend − majb − 1 {Find major length}<br>        Else majlen := majbend − majb<br>      end; {Positive dmaj}<br>    dmin := Nmin*(minbend −minb0) + (minpend −minp0);<br>    If dmin < 0 then<br>      begin {Negative dmin}<br>        dmin := −dmin; |

-continued
GENERAL PROCEDURE

```
    Smin := 1;
    min_off := minp0 −minid;
    If min_off ≦ −0.5 then
        begin {Skip to the next block}
            min_off := min_off + Nmin;
            minb := minb0 − 1
        end {Skip to the next block}
    Else minb := minb0;
        If minpend − 0.5 > minid then minlen := min − minbend − 1
            {Find minor length}
        Else minlen := minb −minbend
    end {Negative dmin}
Else
    begin {Positive dmin}
        Smin := 0;
        min_off := minid −minp0;
        If min_off < −0.5 then
            begin {Skip to the next block}
                min_off := min_off + Nmin; {Skip to the next block}
                minb := minb0 + 1
            end {Skip to the next block}
        Else minb := minb0
        If minpend + 0.5 ≦ minid then minlen := minbend − minb −
            1 {Find minor length}
        Else minlen := minbend − minb
    end; (Positive dmin}
d := −dmaj + 2*dmin*maj_off − 2*dmaj*min_off; {initial error}
incr_maj := 2*Nmaj*dmin;
incr_min := −2*Nmin*dmaj;
While majlen ≧ 0 AND minlen ≧ 0 do
    begin {Loop}
        If (−2*dmaj < d < 0) OR (d = 0 AND not Smin) OR (d =
            −2*dmaj AND Smin) then
        If xgey then Putpixel(majb, minb) {On the Line}
            Else Putpixel(minb, majb);
        If d < 0 OR (d = 0 AND not Smin) then
            begin {On or above the line}
                d := d + incr_maj;
                If Smaj then maj := majb − 1
                    Else majb := majb + 1; {Increment major axis}
                majlen := majlen −1
            end {On or above the line}
        Else
            begin {Below the line}
                d := d + incr_min;
                If Smin then min := min − 1
                    Else minb := minb + 1; {Increment minor axis}
                minlen := minlen −1
            end {Below the line}
    end {Loop}
end;
```

8. Triangle Generation

Figure 11:
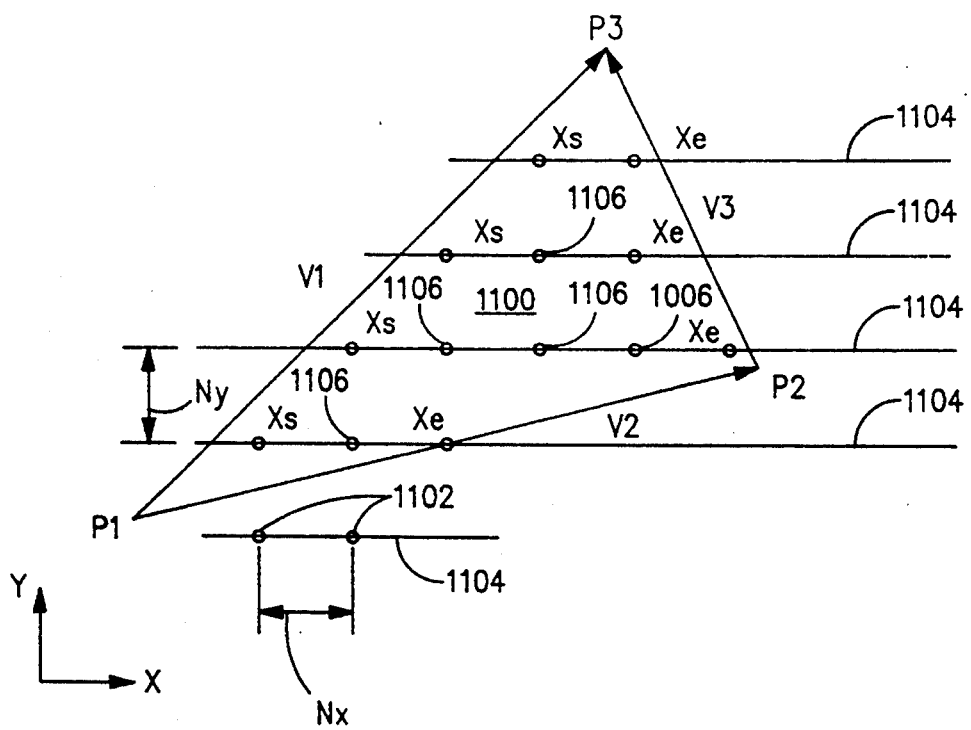
FIG. 11 exemplifies the generation of the interior points of a triangle in accordance with the present invention.

The line generation procedure described above may also be used to draw the interior points of a triangle, each processor 400 drawing the interior pixels over which it has control. FIG. 11 shows a triangle 1100 having vertices P1, P2 and P3. The edges of triangle 1100 comprise vectors V1–V3, which are specially defined to facilitate the use of the drawing procedures described below. V1 spans the vertices P1 and P3 having the largest vertical separation; V1 is directed to the right if the interior of the triangle 1100 is on the right of V1 (as in FIG. 11) and to the left if the interior is on the left. V2 is defined so that it has the same starting point as V1, while V3 is defined so that it has the same ending point as V1.

As described above, an individual processor 400 controls pixels 1102 that are separated horizontally by a distance Nx in scan lines 1104 that are separated by a distance Ny. To draw the interior of a triangle, a slightly modified form of the line generating procedure described above is used to generate, for each scan line 1104 controlled by the individual processor 400, a starting pixel Xs controlled by the processor that is on or on the interior side of vector V1, together with an ending pixel Xe controlled by the processor that is on or on the interior side of vector V2 or V3. In a typical hardware configuration, such as the one described below, a first vector generator would be used to generate the pixels along V1, while a second vector generator would be concurrently used to draw the pixels along V2 and then V3. After the pixels Xs and Xe have been determined for a scan line 1104 passing through the triangle 1100, processor 400 draws those pixels along the scan line controlled by it, including the starting pixel Xs, the ending pixel Xe, and any intervening pixels 1106.

Since each of the other processors 400 of the array 166 is operating in a similar manner to draw the triangle pixels controlled by it, the net result is that the processor array 116 draws all the interior pixels of the triangle. However, since each processor is iterating only for those pixels over which it has control, the drawing time required by a 20processor configuration, for example, is only about 1/20 the time required by a single processor drawing the same triangle.

9. Hardware Configuration

Figure 12:
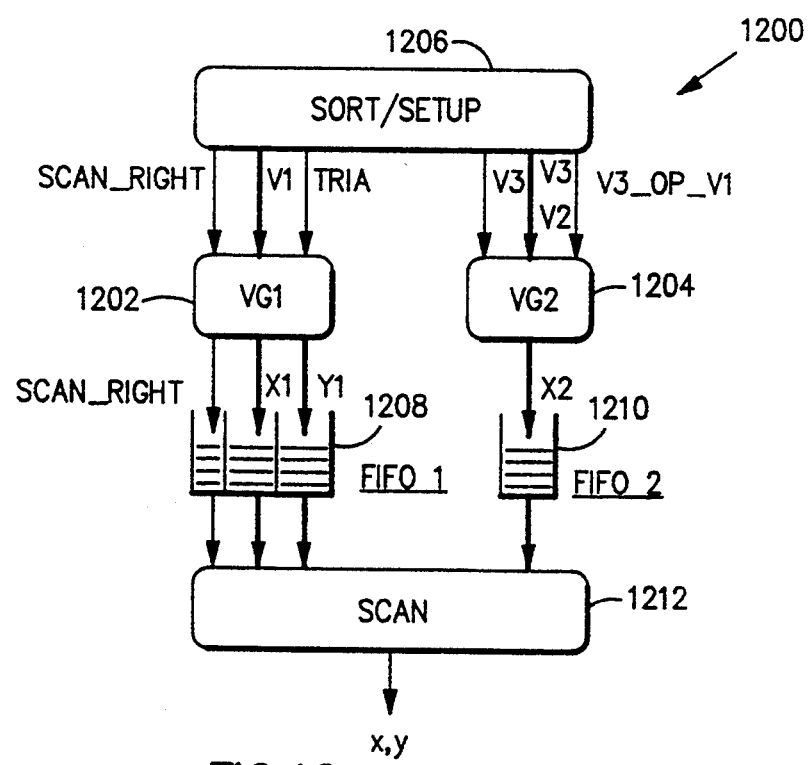
FIG. 12 illustrates a triangle generator containing a pair of vector generators constructed in accordance with the present invention.

FIG. 12 is a hardware block diagram of a triangle generator 1200 incorporating a pair of line or vector generators 1202 (VG1) and 1204 (VG2) constructed in accordance with the present invention. Each processor 400 of the array 116 would include one triangle generator 1200. In addition to vector generators VG1 and VG2, triangle generator includes sort/setup logic 1206, a first FIFO 1208 (FIFO1), a second FIFO 1210 (FIFO2), and scan logic 1212.

Triangle generator 1200 is operable in either line mode (tria=0) or triangle mode (tria=1). In line mode, vector generator VG1 is used to generate the pixels along a line segment that are controlled by the individual processor; vector generator VG2 is not used. In triangle mode, vector generator VG1 is used to generate the pixels Xs along the triangle edge V1 having the greatest y span; vector generator VG2 is used to generate the pixels Xe along the other two edges V2 and V3 (FIG. 11). These edge pixels constitute the starting and ending pixels for each scan line 1104 controlled by the individual processor. Scan logic 1212 draws the interior pixels of the triangle that are controlled by the processor along each scan line, using this endpoint information.

Figure 17:
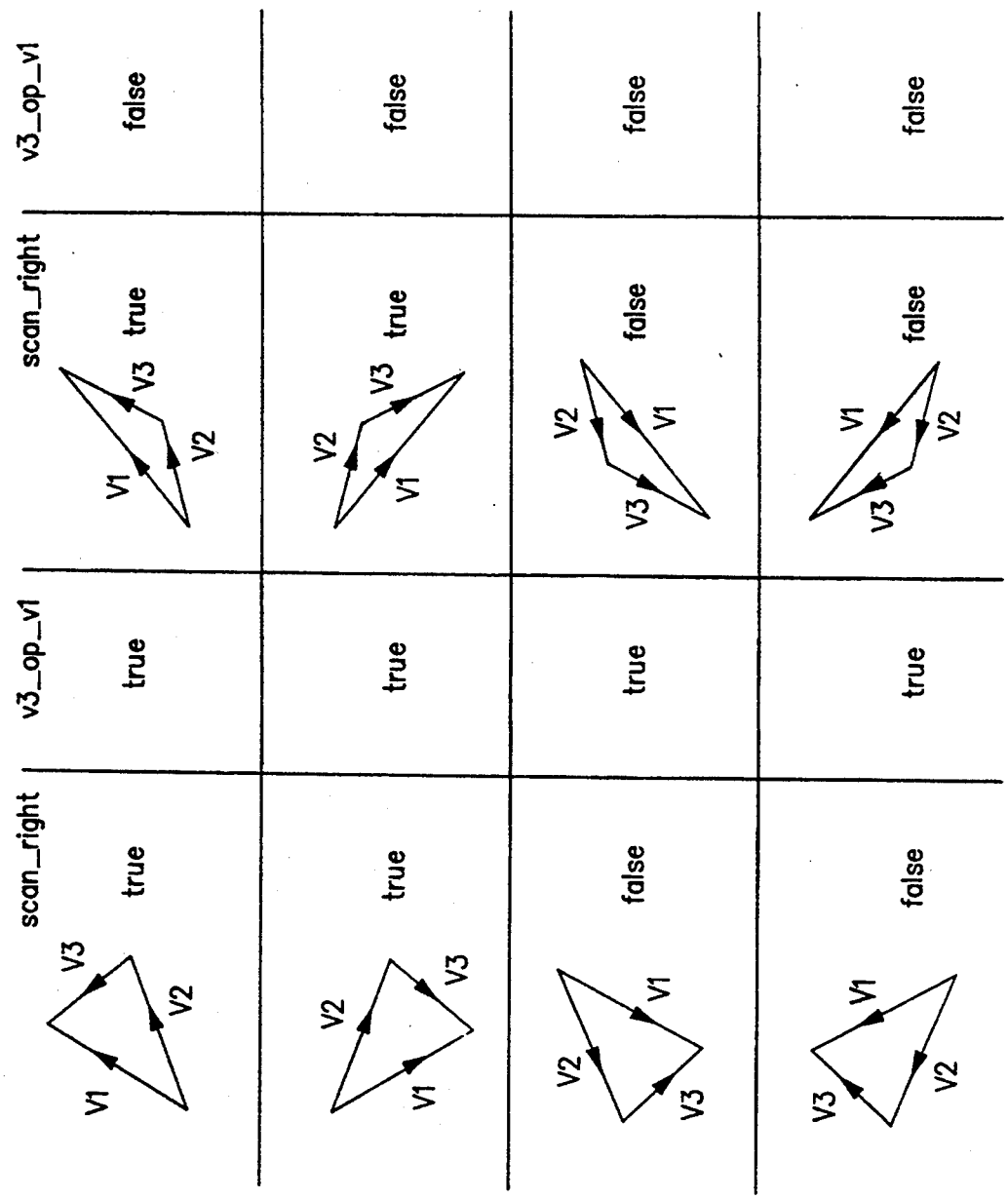
FIG. 17 illustrates various types of triangles that are handled by the triangle generator shown in FIG. 12.

Sort/setup logic 1206 provides vector generator VG1 with the vertex coordinates for edge V1, as well as a mode signal tria, which is 1 (true) in triangle mode, and a scan direction signal scan_right which is 1 (true) if the interior of the triangle lies to the right of V1 (FIG. 17). Sort/setup logic 1206 provides vector generator VG2 with similar vertex coordinate information for the edges V2 and V3, as well as a signal v3, which is 1 (true) if the edge currently being processed is V3, and a signal v3_op_v1 which is 1 (true) if V3 is directed in a different x direction from V1 (FIG. 17).

FIFO1 buffers the output pixels (X1, Y1) generated by vector generator VG1 in a FIFO manner pending their processing by scan logic 1212. Similarly, FIFO2 buffers the output pixels (X2) generated by vector generator VG2 pending their processing by scan logic 1212.

Figure 13:
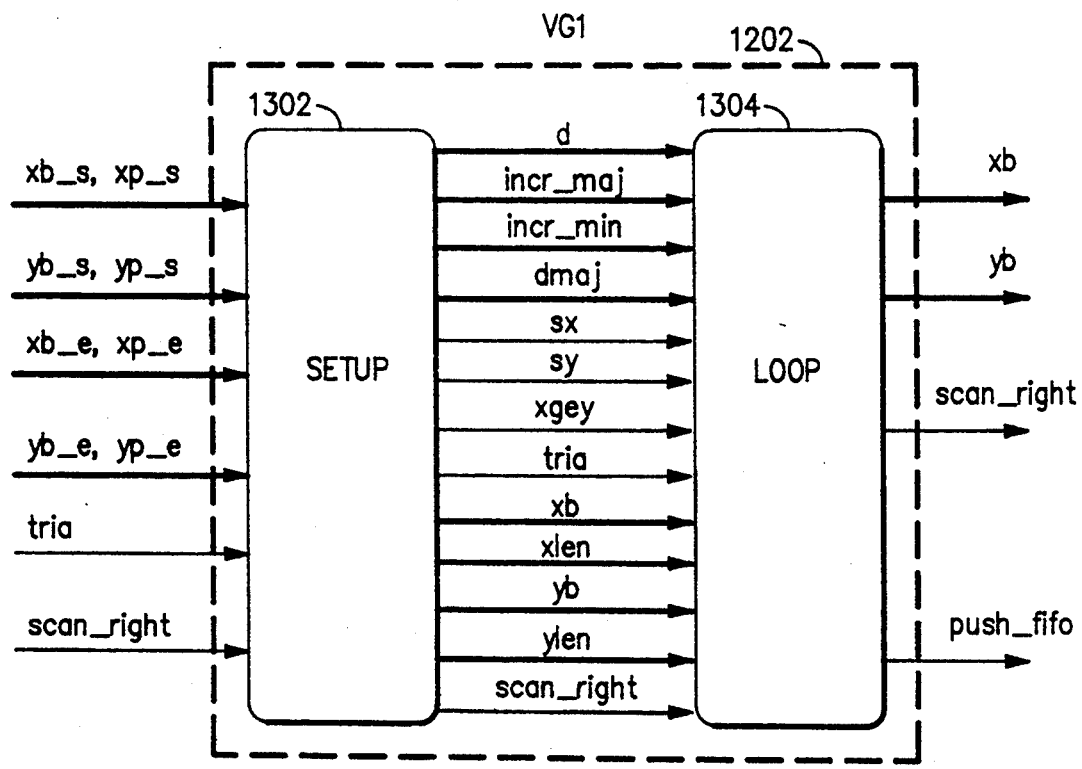
FIGS. 13 and 14 show the internal elements of the vector generators shown in FIG. 12.

Referring to FIG. 13, vector generator VG1 contains setup logic 1302 and loop or iteration logic 1304. Setup logic 1302 accepts the vector endpoints and control signals tria and scan_right and generates the outputs to loop logic 1304. Loop logic 1304 performs the actual Bresenham iterations, generating successive pairs of block coordinates (xb, yb) and a push_fifo signal indicating that the block coordinates are to be pushed onto FIFO1.

Figure 14:
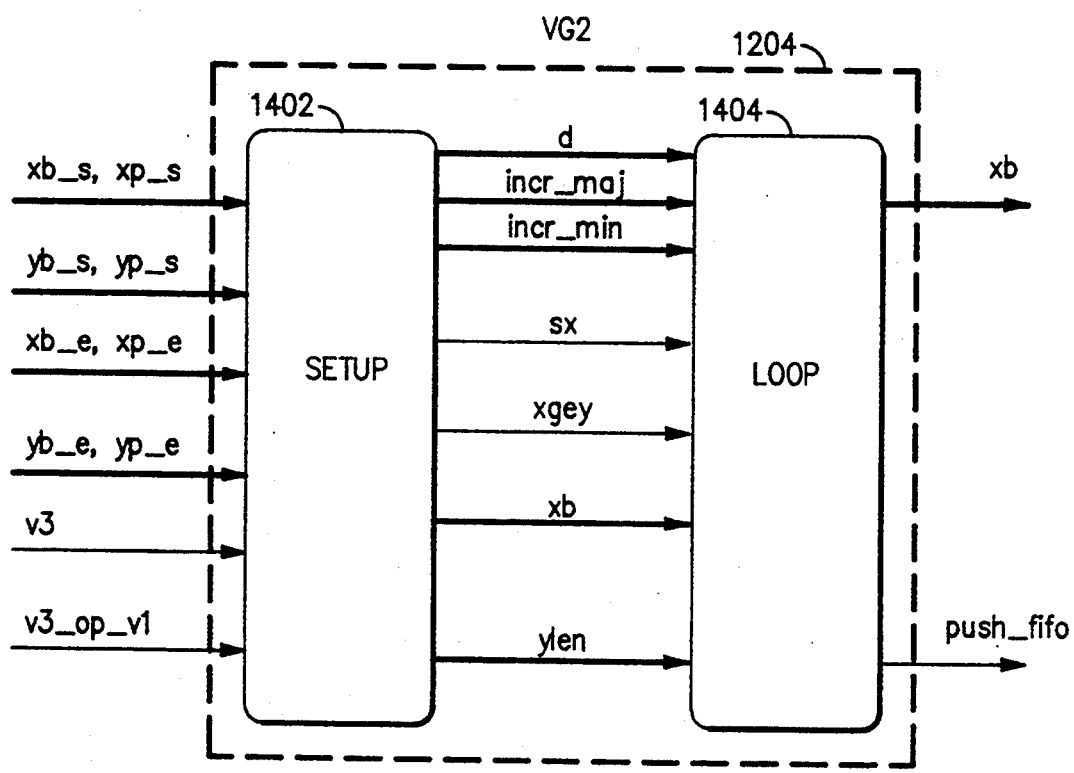

Similarly, referring to FIG. 14, vector generator VG2 contains setup logic 1402 and loop logic 1404. Setup logic 1402 accepts the vector endpoints and control signals v3 and v3_op_v1 and generates the outputs to loop logic 1404. Loop logic 1404 performs the actual Bresenham iterations, generating successive x block coordinates (xb) and a push_fifo signal indicating that the block coordinate is to be pushed onto FIFO2. (VG2 does not generate its own y block coordinate, since it would merely duplicate the y block coordinate generated by VG1.)

Procedures 6-13, set forth below, define the operation of triangle generator 1200 (FIG. 12). Procedure 6 defines the setup and loop procedure of vector generator VG1, while procedure 7 defines the setup and loop procedure of vector generator VG2. Procedures 8A-10 are executed as subroutines of Procedures 6 and 7. The final loop portions of Procedures 6 and 7 are performed by loop logic 1304 and 1404, respectively; Procedures 8A-10 and the initial setup portions of Procedures 6 and 7 are performed by setup logic 1302 and 1402.

Figure 15:
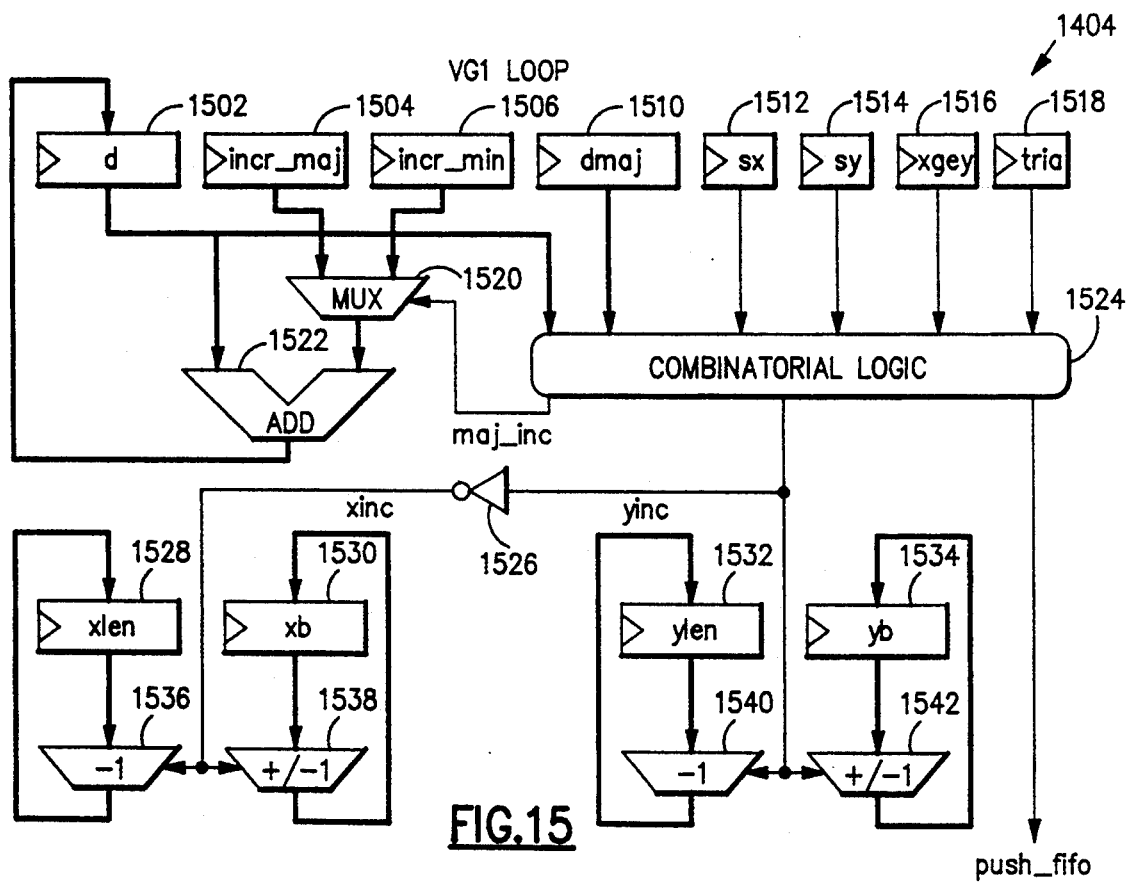
FIGS. 15 and 16 show the internal elements of the loop or iteration logic of the vector generators shown in FIGS. 13 and 14.
Figure 16:
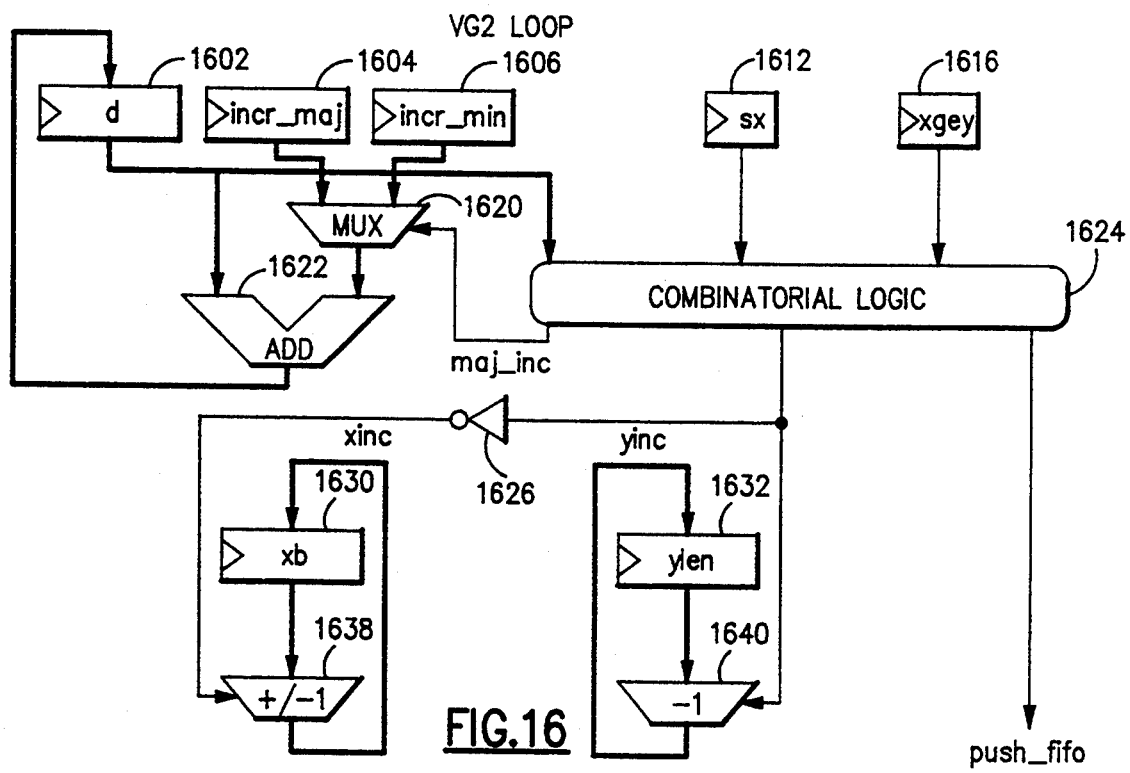

Procedures 11A and 11B define the operation of FIFO1 and FIFO2, respectively. Procedures 12 and 13 define the operation of scan logic 1212 in line mode and triangle mode, respectively. Although the procedures are shown as code sequences, they may be realized either partially or completely by special-purpose hardware logic, as is illustrated in FIGS. 15-16 for loop logic 1304 of VG1 and 1404 of VG2.

As noted above, Procedure 6 defines the operation of vector generator VG1 in either line generation mode (tria= 0) or triangle mode (tria=1). In line generation mode, vector generator VG1 draws the pixels controlled by an individual processor 400 between a starting point (xb_s, xp_s, yb_s, yp_s) and an ending point (xb_e, xp_e, yb_e, yp_e). The setup steps (steps 911-946) are discussed below in connection with Procedures 8A-10. The operation of the iteration loop (steps 947-975) in line generation mode will be discussed for the particular case where dx>dy>0 (xgey =1; sx, sy, smin=0). Other cases are handled in an analogous manner, with appropriate modifications.

On each pass though the iteration loop in line generation mode (tria=0), the error term d is compared with dmaj. If d≦dmaj (maj_inc=1), then the current block position (xb, yb) is stepped along the major axis by incrementing xb or yb and decrementing xlen or ylen, as appropriate, and the error term d is incremented by incr_maj. Otherwise, the current position is stepped along the minor axis and the error term d is incremented by incr_min. If −dmaj<d≦dmaj (online=1), then the current pixel is considered to be on the line and is outputted by pushing the current block coordinates (xb, yb) onto the FIFO controlled by VG1.

On each pass though the iteration loop in triangle mode (tria=1), the error term d is compared with zero to determine the location of the current position relative to the edge V1 (step 649). If the current position is either on the edge V1 or on the interior side of the edge (as indicated by d and xgey), then the current block position (xb, yb) is stepped along the y axis, and the y length count (ylen) decremented (steps 663-670); in addition, the current pixel is outputted as Xs (FIG. 11) by pushing the current block coordinates (xb, yb) onto the FIFO controlled by VG1 (steps 653-654). Otherwise, the current position is stepped along the x axis and the x length count (xlen) is decremented (steps 655-662). Finally, the error term d is incremented by incr_maj or incr_min, depending on which axis is the major axis (steps 671-674).

Procedure 7 defines the operation of vector generator VG2 when drawing points along edges V2 and V3 of triangle 1100. On each pass though the iteration loop, the error term d is compared with zero to determine the location of the current position relative to the edge V2 or V3 (step 732). The action taken as a result of the comparison depends on the edge being drawn, as indicated by v3.

When drawing along edge V2 (v3=0), if the current position is on the exterior side of the edge (as indicated by d and xgey), then the y length count (ylen) is decremented to step the current position along the y axis (step 744); in addition, the previous pixel (xb−1 if drawing in a positive x direction or xb+1 if drawing in a negative x direction) is outputted as Xe (FIG. 11) by pushing the current x block coordinate (xb) onto the FIFO controlled by VG2 (steps 739-743). Otherwise, the current position is stepped along the x axis and the x length count (xlen) is decremented (steps 746-750). Finally, the error term d is incremented by incr_maj or incr_min, depending on which axis is the major axis (steps 751-754).

When drawing along edge V3 (v3=1), the action taken depends on the orientation of V3 relative to V1. If both vectors are oriented in the same x direction (v3_op_v1=0), the procedure is the same as that for V2.

If V3 and V1 have opposite x orientations (v3_op_v1=1), then the procedure is similar to that for V1. In this latter case, if the current position is on or on the exterior side of edge V3 (as indicated by d and xgey), the y length count is decremented to step the current position along the y axis (step 744) and the current pixel is outputted as Xe (steps 737-738). Otherwise, the current position is stepped along the x axis and the x length count (xlen) is decremented (steps 746-750). Finally, the error term d is incremented by incr_maj or incr_min, depending on which axis is the major axis (steps 751-754).

Procedure 8A determines the iteration starting block m (x or y) and pixel offset moff (xoff or yoff) for the minor axis in line generation mode (tria=0) or for both axes in triangle mode (tria=1). In the default situation, the iteration starting block m is the same as the line starting block mb_s (xb_s or yb_s), while the pixel offset moff is mid—mp_s for a positive drawing direction or mp_s—mid for a negative drawing direction. The starting point is moved one block in the drawing direction if necessary so that moff ≧ −0.5 for a positive drawing direction or so that moff > −0.5 for a negative drawing direction.

Procedure 8B is similar to Procedure 8A, but determines the starting block and pixel offset for the major axis in line generation mode (tria=0). In Procedure 6B the starting block is moved one block in the drawing direction if necessary so that moff ≦0.

Procedure 9A determines the number of jumps mlen (xlen or ylen) along the major axis. Normally, for a positive drawing direction, mlen=mb_e−m. The quantity mlen is decremented by one, however, if the ending block pixel controlled by the processor 400 is beyond the end of the line in the major axis direction.

Procedure 9B determines the number of jumps mlen (xlen or ylen) along the minor axis. Normally, for a positive drawing direction, mien=mb_e−m+1. The quantity mlen is decremented by one, however, if the ending block pixel controlled by the processor 400 is beyond the end of the line by more than half a pixel in the minor axis direction.

Procedure 10 determines the initial error d and the major and minor axis increments incr_maj and incr_min. Note that in this procedure the error d is defined as d' above, so that the sign of the error indicates the side of the true line on which the current pixel position lies.

Procedure 11A defines the operation of FIFO 1208 (FIFO1). In response to a push_fifo signal from loop logic 1304 of VG1, FIFO1 increments its address pointer fifo_1 and stores the screen coordinates (Xs, Ys) corresponding to the outputted block coordinates (xb, yb) at the FIFO location pointed to by fifo_1. Procedure 11B similarly defines the operation of FIFO 1210 (FIFO2). In response to a push_fifo signal from loop logic 1404 of VG2, FIFO2 increments its address pointer fifo_2 and stores the screen coordinate (Xe) corresponding to the outputted block coordinate (xb) at the FIFO location pointed to by fifo_2.

Procedure 12 defines the operation of scan logic 1212 in line mode (tria=0). To draw a line, scan logic 1212 simply outputs the pixel coordinates (Xs, Ys) stored in FIFO1, together with a constant intensity value (15) representing a desired foreground color. This intensity value is stored in frame buffer 120 (FIG. 1) at the location indicated by (Xs, Ys).

Procedure 13 defines the operation of scan logic 1212 in triangle mode (tria=1). To draw the interior of a triangle, scan logic 1212 draws, for each scan line (with y value Ys) of the triangle controlled by the individual processor, those pixels along the scan line that are controlled by the processor. The pixels drawn along each scan line include the starting pixel Xs, the ending pixel Xe and any intervening pixels. The drawing direction is from left to right if V1 is on the left side of the triangle (FIG. 17) and is from right to left if V1 is on the right side of the triangle.

In either mode, the pixels drawn by an individual processor 400 are spaced from one another in increments of Nx horizontally and Ny vertically. However, all of the processors working in conjunction with one another will be effective to draw the entire line or triangle, with no pixel gaps.

FIG. 15 shows the internal structure of the loop logic 1304 of VG1. Respective latches 1502-1518 store the initial parameters d, incr_maj, incr_min, dmaj and flags sx, sy, xgey, tria supplied to loop logic 1404. A multiplexer 1520 1520 controlled by a maj_inc signal from combinatorial logic 1524 gates incr_maj to one input of an adder 1522 whenever maj_inc is true and gates incr_min to the adder input whenever maj_inc is false. Adder 1522 receives its other input from the d latch 1502 and routes its output back into the same d latch. Adder 1522 is thus effect on each iteration to increment d by either incr_maj or incr_min, depending on the maj_inc output from combinatorial logic 1524.

Combinatorial logic 1524, which is responsive to d, dmaj and the flags, also generates the push_fifo signal, as well as a yinc signal (indicating a y increment) which is inverted by inverter 1526 to generate an xinc signal (indicating an x increment). These signals are used to control the incrementing or decrementing, as appropriate, of an x iteration count (xlen) register 1528 with a decrementer 1536, an x block coordinate (xb) register 1530 with an incrementer/decrementer 1538, a y iteration count (ylen) register 1532 with a decrementer 1540, and a y block coordinate (yb) register 1534 with an incrementer/ decrementer 1542. Registers 1528 and 1530 are indexed if xinc is true, while registers 1532 and 1534 are indexed if yinc is true.

FIG. 16 shows the internal instruction of the loop logic 1404 of vector generator VG2. The logic elements 1602-1642 are similar to the corresponding elements 1502-1542 of FIG. 15.

---

PROCEDURE 6

```
procedure vgl(xb_s, yb_s, xb_e, yb_e : longint; xp_s, yp_s, xp_e,
    yp_e : single; tria, scan_right : boolean);
  var
    dx,dy,dmaj : single;
    sx,sy,smin : boolean;
    xoff,yoff : single;
    xb,yb : longint;
    xlen,ylen : longint;
```

```
        d, incr_maj, incr_min : single;
        xgey : boolean;
        xinc,yinc,maj_inc : boolean;
        online : boolean;
begin
    dx := Nx*(xb_e − xb_s) + (xp_e − xp_s);
    dy := Ny*(yb_e − yb_s) + (yp_e − yp_s);
    sy := dy < 0;
    sx := (dx < 0) or ((dx = 0) and not scan_right);
    dx := abs(dx);
    dy := abs(dy);
    xgey := dx ≧ dy;
    if xgey or tria then
        major_start_pt(xb_s,xp_s,Nx,xid,sx,xb,xoff)
    else
        minor_start_pt(xb_s,xp_s,Nx,xid,sx,xb,xoff);
    if not xgey or tria then
        major_start_pt(yb_s,yp_s,Ny,yid,sy,yb,yoff)
    else
        minor_start_pt(yb_s,yp_s,Ny,yid,sy,yb,yoff);
    if xgey then
        major_length(xb,xb_e,xp_e,xid,sx,xlen)
    else
        minor_length(xb,xb_e,xp_e,xid,sx,xlen);
    if tria or not xgey then
        major_length(yb,yb_e,yp_e,yid,sy,ylen)
    else
        minor_length(yb,yb_e,yp_e,yid,sy,ylen);
    if xgey then
        begin
            dmaj := dx;
            smin := sy;
            init_error(dx,dy,xoff,yoff,Nx,Ny,d,incr_maj,incr_min
        end
    else
        begin
            dmaj := dy;
            smin := sx;
            init_error(dy,dx,yoff,xoff,Ny,Nx,d,incr_maj,incr_min
        end;
    while ((xlen ≧ 0) or tria) and (ylen ≧ 0) do
        begin
            maj_inc := (d < 0) or ((d = 0) and not xgey) or (not
                tria and ((d < dmaj) or (d = dmaj) and not
                smin)));
            online := maj_inc and ((d > −dmaj) or ((d = −dmaj) and
                smin));
            yinc := xgey xor maj_inc;
            xinc := not yinc;
            if (online and not tria) or (yinc and tria) then
                push_fifo1(x,y);
            if xinc then
                begin
                    if sx then
                        xb := xb − 1
                    else
                        xb := xb + 1;
                    xlen := xlen − 1;
                end;
            if yinc then
                begin
                    if sy then
                        yb := yb − 1
                    else
                        yb := yb + 1;
                    ylen := ylen − 1;
                end;
            if maj_inc then
                d := d + incr_maj
            else
                d := d + incr_min;
        end;
    end;
procedure vg2(xb_s, yb_s, xb_e, yb_e : longint; xp_s, yp_s, xp_e,
    yp_e : single; v3_op_v1, v3 : boolean);
var
    dx,dy : single;
    sx,sy : boolean;
    xoff,yoff : single;
    xb,yb : longint;
    ylen : longint;
    d, incr_maj, incr_min : single;
    xgey : boolean;
    xinc,yinc,maj_inc : boolean;
begin
    dx := Nx*(xb_e − xb_s) + (xp_e − xp_s);
    dy := Ny*(yb_e − yb_s) + (yp_e − yp_s);
    sx := dx < 0;
    sy := dy < 0;
    dx := abs(dx);
    dy := abs(dy);
    xgey := dx ≧ dy;
    major_start_pt(xb_s,xp_s,Nx,xid,sx,xb,xoff);
    major_start_pt(yb_s,yp_s,Ny,yid,sy,yb,yoff);
    if sy then
        ylen := yb − yb_e
    else
        ylen := yb_e − yb;
    if ((yp_e > yid) and sy) or ((yp_e < yid) and not sy) or
        ((yp_e = yid) and not v3) then
        ylen := ylen − 1;
    if xgey then
        init_error(dx,dy,xoff,yoff,Nx,Ny,d,incr_maj, incr_min)
    else
        init_error(dy,dx,yoff,xoff,Ny,Nx,d,incr_maj, incr_min};
    while (ylen ≧ 0) do
        begin
            maj_inc := (d < 0) or ((d = 0) and (xgey xor (v3 and
                v3_op_v1)));
            yinc := xgey xor maj_inc;
            xinc := not yinc;
            if yinc then
                begin
                    if v3 and v3_op_v1 then
                        push_fifo2(x)
                    else
                        if sx then
                            push_fifo2(x+1)
                        else
                            push_fifo2(x−1);
                    ylen := ylen − 1;
                end;
            if xinc then
                if sx then
                    xb := xb − 1
                else
                    xb := xb + 1;
            if maj_inc then
                d := d + incr_maj
            else
                d := d + incr_min;
        end;
end;
```

PROCEDURE 8A

```
procedure minor_start_pt(mb_s : longint; mp_s : single; Nm,mid :
        longint; sm : boolean; var mb : longint; var moff : single);
begin
    if sm then
        moff := mp_s − mid
    else
        moff := mid − mp_s;
    if (moff < −0.5) or ((moff = −0.5) and sm) then
        begin
            moff := moff + Nm;
            if sm then
                mb := mb_s − 1
            else
                mb := mb_s + 1;
        end
    else
        mb := mb_s;
end;
```

PROCEDURE 8B

```
procedure major_start_pt(mb_s : longint; mp_s : single; Nm,mid :
        longint; sm : boolean; var mb : longint; var moff :
        single);
begin
    if sm then
        moff := mp_s − mid
    else
        moff := mid − mp_s;
    if moff < 0 then
        begin
            moff := moff + Nm;
```

```
                    if sm then
                        mb := mb_s - 1
                    else
                        mb := mb_s + 1;
                end
            else
                mb := mb_s;
        end;
```

PROCEDURE 9A

```
procedure major_length(mb,mb_e : longint; mp_e : single; mid :
    longint; sm : boolean; var mlen : longint);
    begin
        if sm then
            mlen := mb - mb_e
        else
            mlen := mb_e - mb;
        if ((mp_e > mid) and sm) or ((mp_e < mid) and not sm) then
            mlen := mlen - 1;
    end;
```

PROCEDURE 9B

```
procedure minor_length(mb,mb_e : longint; mp_e : single; mid :
    longint; sm : boolean; var mlen : longint);
    begin
        if sm then
            mlen := mb - mb_e + 1
        else
            mlen := mb_e - mb + 1;
        if ((mp_e - 0.5 > mid) and sm) or ((mp_e + 0.5 < mid) and
                not sm) then
            mlen := mlen - 1;
    end;
```

PROCEDURE 10

```
procedure init_error(dmaj,dmin,maj_off,min_off : single; Nmaj,Nmin
        : integer; var d,incr_maj,incr_min : single);
    begin
        d := 2*dmin*maj_off - 2*dmaj*min_off;
        incr_maj := 2*Nmaj*dmin;
        incr_min := -2Nmin*dmaj;
    end;
```

PROCEDURE 11A

```
procedure push_fifo1(xb,yb :integer)
    begin
        fifo_1 := fifo_1 + 1;
        Xs[fifo_1] := xb*Nx + xid;
        Ys[fifo_1] := yb*Ny + yid;
    end;
```

PROCEDURE 11B

```
procedure push_fifo2(xb :integer)
    begin
        fifo_2 := fifo_2 + 1;
        Xe[fifo_2]:= xb*Nx + xid;
    end;
```

PROCEDURE 12

```
Procedure span_line
var i:longint;
begin
    for i := 0 to fifo_1 do
        putpixel(Xs[i],Ys[i],15);
end;
```

PROCEDURE 13

```
Procedure span_tri(scan_right:boolean);
var i,j,x,y:longint;
begin
    for i :=o to fifo_1 do
        begin
            x := Xs[i];
            y := Ys[i];
            while ((x ≦ Xe[i]) and scan_right) or ((x ≧ Xe[i] and not
                    scan_right) do
                begin
                    if (getpixel(x,y) ≠ 0) then putpixel (x,y,15)
                    else putpixel (x,y,7);
                    if scan_right then
                        x := x + Nx
                    else
                        x := x - Nx;
                end;
        end;
end;
```

GLOSSARY

| | |
|---|---|
| d | error term |
| d0 | error term at point 0 |
| d1 | error term at point 1 |
| di | error term at point i; dx(e(Ti) − e(Si)) |
| di+1 | error term at point i + 1 |
| dmaj | line length along major axis |
| dmin | line length along minor axis |
| dx | line length along x-axis |
| dx1 | line length along first coordinate axis (x1) |
| dx2 | line length along second coordinate axis (x2) |
| dy | line length along y-axis |
| e(Si) | error at Si |
| e(Ti) | error at Ti |
| incr1 | error term increment along first coordinate axis (x1) |
| incr2 | error term increment along second coordinate axis (x2) |
| incr_maj | error term increment along major axis |
| incr_min | error term increment along minor axis |
| incrx | error term increment along x-axis |
| incrxy | error term increment along diagonal |
| incry | error term increment along y-axis |
| mb | current x or y block coordinate |
| maj_inc | 1 (true) if increment along major axis |
| maj_off | subpixel offset along major axis |
| mb_e | block coordinate of ending point |
| mb_s | block coordinate of starting point |
| mid | processor array coordinate |
| min_off | subpixel offset along minor axis |
| mlen | number of jumps along x- or y-axis |
| moff | subpixel offset along x- or y-axis |
| mp_e | pixel coordinate of ending point |
| mp_s | pixel coordinate of starting point |
| N1 | block size along first coordinate axis (x1) |
| N2 | block size along second coordinate axis (x2) |
| Nm | block size along x- or y-axis |
| Nmaj | block size along major axis |
| Nmin | block size along minor axis |
| Nx | block size along x-axis |
| Ny | block size along y-axis |
| online | 1 (true) if current pixel is within 0.5 pixel of true line |
| push_fifo | 1 (true) if current pixel is to be outputted |
| scan_right | 1 (true) if interior is to right of V1 |
| Si | lower pixel at point i |
| sm | |
| smin | |
| sx | x sign: |
| sy | y sign: 1 (true) if dy < 0, 0 (false) if dy ≧ 0 |
| Ti | upper pixel at point i |
| tria | 1 if in triangle mode |
| v3 | |
| v3_op_v1 | |
| x | x screen coordinate |
| x0 | x coordinate of initial line point |
| x1 | x coordinate of first point controlled by processor |
| x1off | (subpixel) offset along first coordinate axis (x1) |
| x2off | (subpixel) offset along second coordinate axis (x2) |
| xb | current x block coordinate |
| xb_e | x block coordinate of ending point |
| xb_s | x block coordinate of starting point |
| xend | x coordinate of ending point |
| xgey | 1 if dx ≧ dy |
| xi | x coordinate of point i |
| xi+1 | x coordinate of point i + 1 |
| xid | x processor array coordinate |
| xinc | 1 (true) if increment along x-axis |
| xlen | number of jumps along x-axis |
| xoff | (subpixel) offset along x-axis |
| xp_e | x pixel coordinate of ending point |
| xp_s | x pixel coordinate of starting point |
| y | y screen coordinate |
| y0 | y coordinate of initial line point |
| y1 | y coordinate of first point controlled by processor |
| yb | current y block coordinate |
| yb_e | y block coordinate of ending point |
| yb_s | y block coordinate of starting point |
| yend | y coordinate of ending point |
| yi | y coordinate of point i |
| yi+1 | y coordinate of point i + 1 |
| yid | y processor array coordinate |
| yinc | 1 (true) if increment along y-axis |
| ylen | number of jumps along y-axis |

| | |
|---|---|
| yoff | (subpixel) offset along y-axis |
| yp_e | y pixel coordinate of ending point |
| yp_s | y pixel coordinate of starting point |

Although the address values generated by FIFO1 and FIFO2 and scan logic 1212 are described above as being conventional screen coordinates (x, y), the actual values generated may be block coordinates (xb, yb), since the pixel coordinates (xp, yp) for a particular processor 400 are always (xid, yid).

Although the triangle is drawn along horizontal scan lines in the embodiment shown above, the direction of scan could alternatively be vertical. Further, while in the preferred form of the invention the processors form a 2-D array, in its broadest aspects the invention is also usable in a linear (1-D) processor array, in which each processor control pixels lying along linear strips of the screen. In addition, the concepts relating to subpixel precision are also applicable to a single-processor embodiment, in which Nx and Ny are both 1.

What is claimed is:

1. In a computer graphics system in which graphics primitives are converted to an image for display on a display surface, said image comprising an array of pixels having predetermined spacings along first and second coordinate axes, a method of generating a pixel approximation at inteqer spacings of a line extending between first and second endpoints that are defined with fractional precision in terms of said pixel spacing along said coordinate axes, said method comprising the steps of:
   (a) initially:
      (1) generating an initial pixel position representing an integer pixel position in terms of said pixel spacings along said coordinate axes, said initial position being offset by a first and second non-inteqer offset value along said first and second coordinate axes relative to said first endpoint;
      (2) determining said first and second non-integer offset values along said axes between said initial pixel position and the first endpoint; and
      (3) generating iteration parameters for said line including an initial error term, a first increment, and a second increment, said initial error term including an adjustment for said first and second non-inteqer, offset values obtained by multiplying the first offset value by the spacing between said endpoints along the second coordinate axis and multiplying the second offset value by the spacing between said endpoints on the first coordinate axis; and
   (b) iteratively:
      (1) stepping said error term value by one of said increments selected based on the value of said error term to generate a new error term value; and
      (2) stepping the current pixel position along said axes in accordance with the current error term value.

2. A method as in claim 1 in which said initial error term includes an adjustment proportional to 2*dx2*x1off−2*dx1*x2off, where dx1 and dx2 are the spacings between said endpoints along said first and second axes and x1off and x2off are the offset values along said axes between the initial pixel position and the first endpoint.

3. In a computer graphics system in which graphics primitives are converted to an image for display on a display surface, said image comprising an array of pixels having predetermined spacings along first and second coordinate axes, a vector generator for generating a pixel approximation at inteqer spacinqs of a line extending between first and second endpoints that are defined with fractional precision in terms of said pixel spacings along said coordinate axes, comprising:
   (a) initial setup means including:
      (1) means for generating an initial pixel position representing an integer pixel position in terms of said pixel spacings along said coordinate axes, said initial position being offset by a first and second non-integer offset value along said first and second coordinate axes relative to said first endpoint;
      (2) means for determining said first and second non-integer offset values along said axes between said initial pixel position and the first endpoint; and
      (3) means for generating iteration parameters for said line including an initial error term, a first increment, and a second increment, said initial error term including an adjustment for said first and second non-inteqer offset values obtained by multiplying the first offset value by the spacing between said endpoints along the second coordinate axis and multiplying the second offset value by the spacing between said endpoints on the first coordinate axis; and
   (b) iteration means including:
      (1) means for stepping said error term value by one of said increments selected based on the value of said error term to generate a new error term value; and
      (2) means for stepping the current pixel position along said axes in accordance with the current error term value.

4. In a computer graphics system in which an array of processors are used to convert graphics primitives to an image for display on a display surface, said image comprising an array of pixels having predetermined spacings along first and second coordinate axes, each of said processors controlling a set of pixels of said image spaced from one another by a predetermined number of pixels along said first axis, a method of operating said processors to generate a pixel approximation of a line extending between first and second endpoints, said method comprising the steps of:
   (a) initially, for each of said processors:
      (1) generating an initial pixel position representing a pixel controlled by the processor, said initial position having a first offset value along said first axis relative to said first endpoint;
      (2) determining said first offset value along said first axis between said initial pixel position and the first endpoint; and
      (3) generating iteration parameters including an initial error term, a first increment, and a second increment, said initial error term including an adjustment for said first offset value along said first axis obtained by multiplying said first offset value by the spacing between said endpoints along said second axis; and
   (b) iteratively, for each of said processors:

(1) stepping the error term value generated for said processor by one of said increments selected based on the value of said error term to generate a new error term value.; and (2) stepping the current pixel position to an adjacent pixel position controlled by the same processor in accordance with the current error term value.

5. A method as in claim 4 in which said iteratively performed step (b) further comprises the step of generating a pixel corresponding to the current pixel position if the current pixel position bears a predetermined relationship to said line as indicated by the current error term value.

6. A method as in claim 4 in which the current pixel position is stepped along either said first coordinate axis or along said second coordinate axis depending on the current error term value.

7. A method as in claim 4 in which the set of pixels controlled by each of said processors is further spaced by a predetermined second number of pixels along said second axis, said initial position having a second offset value along said said second coordinate axis relative to said first endpoint, said initial error term including an adjustment for said second offset value obtained by multiplying said second offset value by the spacing between said endpoints along said first coordinate axis.

8. A method as in claim 7 in which said predetermined first and second numbers of pixels are both greater than one.

9. A method as in claim 7 in which only one of said predetermined first and second numbers of pixels is greater than one.

10. A method as in claim 7 in which said initial pixel position for each of said processors is selected so that $$0 \leq x1\text{off} \leq N1,$$

where x1off is the offset value along said first axis between said initial pixel position and said first endpoint and N1 is said first predetermined number of pixels.

11. A method as in claim 7 in which said endpoints have a major spacing along said first axis and a minor spacing along said second axis.

12. A method as in claim 11 in which said initial pixel position for each of said processors is selected so that $$-0.5 \leq x2\text{off} \leq N2-0.5,$$

where x2off is the offset value along said second axis between said initial pixel position and said first endpoint and N2 is said second predetermined number of pixels.

13. A method as in claim 11 in which said iteration parameters are generated in accordance with the equations:

$$d = d0 + 2*dx2*x1\text{off} - 2*dx1*x2\text{off}$$

$$\text{incr1} = 2*N1*dx1$$

$$\text{incr2} = -2*N2*dx2$$

where d is the initial error term, d0 is the error term defined for the first endpoint, incr1 and incr2 are the error increments for steps along said first and second axes, and x1off and x2off are the offsets along said axes between the initial pixel position and the first endpoint.

14. A method as in claim 13 in which d0 is 0.

15. A method as in claim 13 in which d0 is $-dx1$.

16. A method as in claim 13 in which a pixel is generated for the current pixel position if $$d0-dx1 > d > d0+dx1.$$

17. A method as in claim 7 in which said initial error term contains a first term proportional to dx2*x1off and a second term proportional to dx1*x2off, where x1off and x2off are respectively the first and second offset values along said first and second axes between the initial pixel position and the first endpoint and dx1 and dx2 are the spacings of said endpoints along said axes.

18. A method as in claim 7 in which said first increment is proportional to N1*dx2, where N1 is said first predetermined number of pixels and dx2 is the spacing of said endpoints along said second axis.

19. A method as in claim 7 in which said second increment contains a term that is proportional to N2*dx1, where N2 is said second predetermined number of pixels and dx1 is the spacing of said endpoints along said first axis.

20. A method as in claim 7 in which said first and second predetermined numbers of pixels are the same, said current pixel position being stepped along both axes if the error term value is within a predetermined range.

21. In a computer graphics system in which an array of processors are used to convert graphics primitives to an image for display on a display surface, said image comprising an array of pixels having predetermined spacings along first and second coordinate axes, each of said processors controlling a set of pixels of said image spaced from one another by a predetermined number of pixels along said first axis, a parallel vector generator for generating a pixel approximation of a line extending between first and second endpoints, comprising:

(a) initial setup means associated with each of said processors including:

(1) means for generating an initial pixel position representing a pixel controlled by the processor, said initial position having a first offset value along said first axis relative to said first endpoint;

(2) means for determining said first offset value along said first axis between said initial pixel position and the first endpoint; and (3) means for generating iteration parameters including an initial error term, a first increment, and a second increment, said initial error term including an adjustment for said first offset value along said first axis obtained by multiplying said first offset value by the spacing between said endpoints along said second axis; and (b) iteration means associated with each of said processors including:

(1) means for stepping the error term value generated for said processor by one of said increments selected based on the value of said error term to generate a new error term value; and (2) means for stepping the current pixel position to an adjacent pixel position controlled by the same processor in accordance with the current error term value.

22. A triangle generator including a plurality of pairs of vector generators as in claim 21, each pair of vector generators being associated with one of said processors and being operative to generate pairs of pixels controlled by the processor along successive scan lines, each pair of pixels bearing a predetermined relationship to the edges of a triangle intersecting the corresponding scan line.

* * * * *

UNITED STATES PATENT AND TRADEMARK OFFICE
CERTIFICATE OF CORRECTION

PATENT NO. : 5,422,991           Page 1 of 2
DATED      : June 6, 1995
INVENTOR(S): Mark C. Fowler It is certified that error appears in the above-indentified patent and that said Letters Patent is hereby corrected as shown below:

Col. 6, line 37, "e¦si=y-1-y." should be on the next line by itself, then delete "y" and substitute therefor --y--;

Line 44, delete "<" and insert --≤--;

Col. 7, line 1 delete ">" and insert --≤--;

Line 20 "yoff=y1-y0" should be on the next line by itself;

Col. 8 line 10, before "in" and insert --400--

Line 41 delete "<" and insert --≤--;

Col. 9 line 4 delete "<" and insert --≤-- (second occurrence)

Col. 10, at line 50, please insert the following just before the table begins for "Procedure 6".

--Reproduced below are Procedures 1A-1J together with a glossary of variable names used in this specification --

Col. 15 line 20, delete "integer" and insert --integer--.

Line 35, delete "integer" and insert --integer--.

Line 47, delete "integer" and insert --integer--.

UNITED STATES PATENT AND TRADEMARK OFFICE
CERTIFICATE OF CORRECTION

PATENT NO. : 5,422,991
DATED : June 6, 1995
INVENTOR(S) : Mark C. Fowler

It is certified that error appears in the above-indentified patent and that said Letters Patent is hereby corrected as shown below:

Col. 26, line 6, delete 'integer" and insert --integer--;
line 28, delete 'non-integer' and insert --non-integer--; and
Col. 28, line 4, delete '>" both occurrences and substitute therefor --<-- both occurrences.

Signed and Sealed this

Seventh Day of May, 1996

Attest:

BRUCE LEHMAN

Attesting Officer     Commissioner of Patents and Trademarks